US010254547B2

(12) United States Patent
Tremblay et al.

(10) Patent No.: US 10,254,547 B2
(45) Date of Patent: *Apr. 9, 2019

(54) METHOD AND APPARATUS FOR HEAD WORN DISPLAY WITH MULTIPLE EXIT PUPILS

(71) Applicant: North Inc., Kitchener (CA)

(72) Inventors: Eric Tremblay, St. Sulpice (CH);
Mickael Guillaumee, Neuchatel (CH);
Christophe Moser, Lausanne (CH)

(73) Assignee: North Inc., Kitchener, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/498,354

(22) Filed: Apr. 26, 2017

(65) Prior Publication Data

US 2017/0293147 A1    Oct. 12, 2017

Related U.S. Application Data

(63) Continuation of application No. 14/780,108, filed as application No. PCT/IB2014/060134 on Mar. 25, (Continued)

(51) Int. Cl.
*G09G 5/00* (2006.01)
*G02B 27/01* (2006.01)
(Continued)

(52) U.S. Cl.
CPC ......... *G02B 27/0172* (2013.01); *G02B 5/188* (2013.01); *G02B 5/189* (2013.01);
(Continued)

(58) Field of Classification Search
CPC . G02B 5/08; G02B 5/188; G02B 5/32; G02B 26/0816; G02B 26/0833;
(Continued)

(56) References Cited

U.S. PATENT DOCUMENTS 5,162,828 A * 11/1992 Furness .................... G01S 13/60
351/158
5,467,104 A * 11/1995 Furness, III ........... G02B 26/10
345/8
(Continued)

FOREIGN PATENT DOCUMENTS

CN    102472892 A    5/2015
JP    2003029198     1/2003
(Continued)

*Primary Examiner* — Joe H Cheng
(74) *Attorney, Agent, or Firm* — Cozen O'Connor

(57) ABSTRACT

A method for displaying an image viewable by an eye, the image being projected from a portable head worn display, comprises steps of: emitting a plurality of light beams of wavelengths that differ amongst the light beams; directing the plurality of light beams to a scanning mirror; modulating in intensity each one of the plurality of light beams in accordance with intensity information provided from the image, whereby the intensity is representative of a pixel value within the image; scanning the plurality of light beams in two distinct axes with the scanning mirror to form the image; and redirecting the plurality of light beams to the eye using a holographic optical element acting as a reflector of the light beams, whereby the redirecting is dependent on the wavelength of the light beam, to create for each light beam an exit pupil at the eye that is spatially separated from the exit pupils of the other light beams.

28 Claims, 29 Drawing Sheets

Related U.S. Application Data 2014, now Pat. No. 9,846,307, which is a continuation of application No. PCT/IB2013/060218, filed on Nov. 18, 2013, which is a continuation of application No. PCT/IB2013/052347, filed on Mar. 25, 2013, now abandoned.

(51) Int. Cl.

| | |
|---|---|
| *G02B 26/10* | (2006.01) |
| *G02B 5/18* | (2006.01) |
| *G02B 26/08* | (2006.01) |
| *G03H 1/04* | (2006.01) |
| *G03H 1/26* | (2006.01) |

(52) U.S. Cl.
CPC ......... *G02B 26/0833* (2013.01); *G02B 26/10* (2013.01); *G03H 1/0402* (2013.01); *G02B 2027/011* (2013.01); *G02B 2027/014* (2013.01); *G02B 2027/0112* (2013.01); *G02B 2027/0125* (2013.01); *G02B 2027/0174* (2013.01); *G02B 2027/0178* (2013.01); *G02B 2027/0187* (2013.01); *G03H 2001/0439* (2013.01); *G03H 2001/266* (2013.01); *G03H 2222/12* (2013.01); *G03H 2222/13* (2013.01)

(58) Field of Classification Search
CPC ...... G02B 26/10; G02B 26/105; G02B 27/01; G02B 27/0103; G02B 27/017; G02B 27/0172; G02B 2027/0109; G02B 2027/0174; G02B 2027/0198; G06F 3/01; G06F 3/013; G02F 1/26; H04N 5/7491
See application file for complete search history.

(56) References Cited

U.S. PATENT DOCUMENTS

| | | | |
|---|---|---|---|
| 5,596,339 A | | 1/1997 | Furness, III et al. |
| 5,701,132 A | * | 12/1997 | Kollin .................. G02B 26/101 345/7 |
| 5,982,343 A | * | 11/1999 | Iba ...................... G02B 27/0172 345/8 |
| 6,043,799 A | * | 3/2000 | Tidwell .................. G02B 7/287 345/7 |
| 6,388,641 B2 | * | 5/2002 | Tidwell ................ G02B 27/017 345/8 |
| 9,846,307 B2 | * | 12/2017 | Tremblay ........... G02B 27/0172 |
| 2001/0043163 A1 | | 11/2001 | Waldern et al. |
| 2009/0201589 A1 | * | 8/2009 | Freeman ............ G02B 27/0103 359/630 |
| 2010/0045933 A1 | * | 2/2010 | Eberl ...................... A61B 3/113 351/210 |
| 2010/0079865 A1 | | 4/2010 | Saarikko et al. |
| 2012/0236031 A1 | * | 9/2012 | Haddick ............. G02B 27/0093 345/633 |
| 2013/0050642 A1 | * | 2/2013 | Lewis .................... A61B 3/113 351/204 |
| 2013/0050833 A1 | * | 2/2013 | Lewis ................ G06K 9/00604 359/630 |
| 2017/0102548 A1 | * | 4/2017 | Tremblay ........... G02B 27/0172 |
| 2017/0205630 A1 | * | 7/2017 | Tremblay ........... G02B 27/0103 |

FOREIGN PATENT DOCUMENTS

| | | |
|---|---|---|
| JP | 2004333714 | 11/2004 |
| JP | 2007133072 | 5/2007 |
| JP | 2009282085 | 5/2008 |
| JP | 2009134276 | 6/2009 |
| JP | 2009244869 | 10/2009 |
| WO | 2009041055 | 4/2009 |

\* cited by examiner

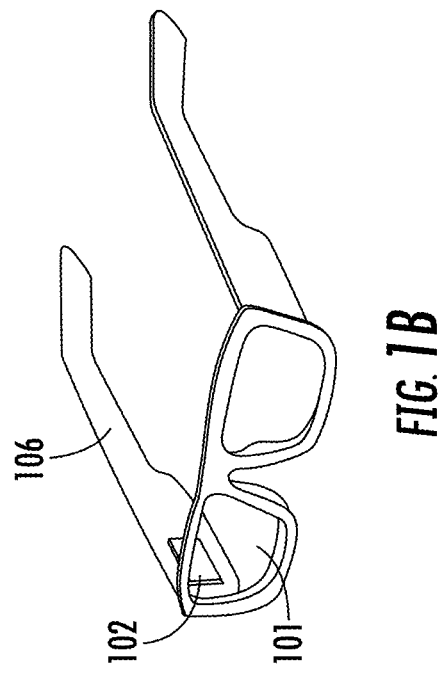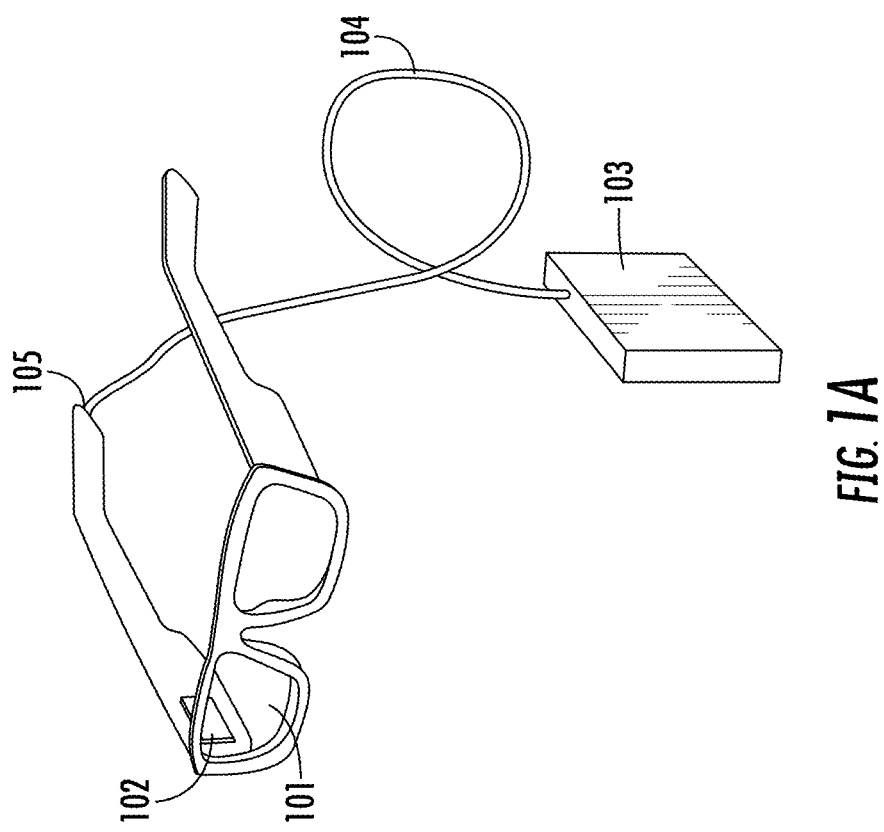

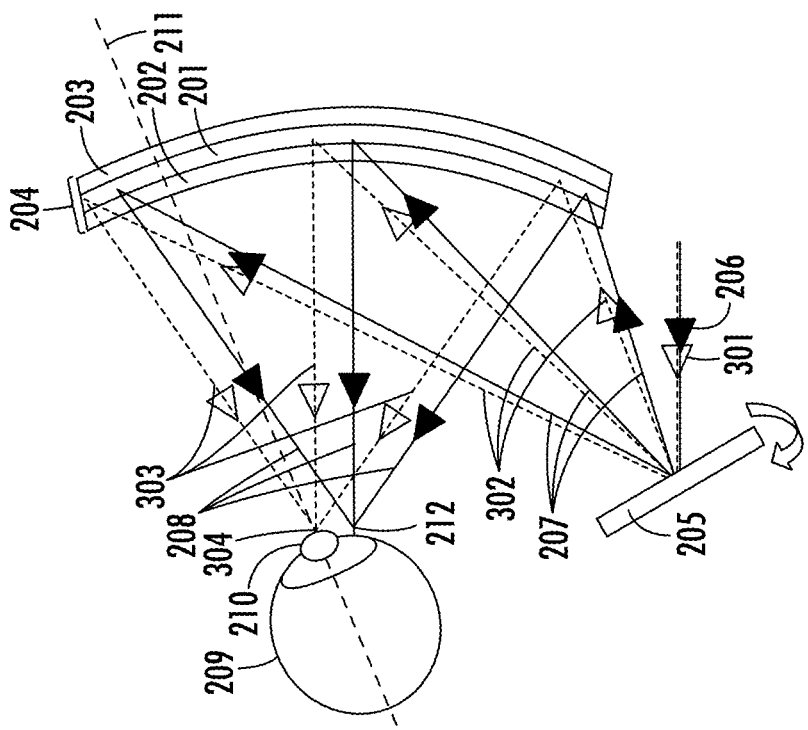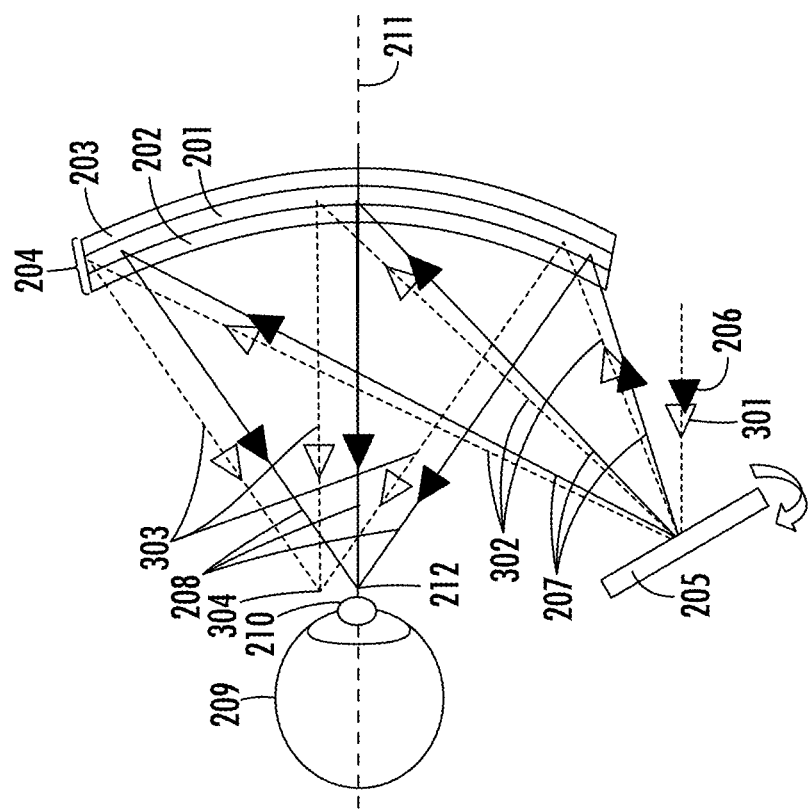

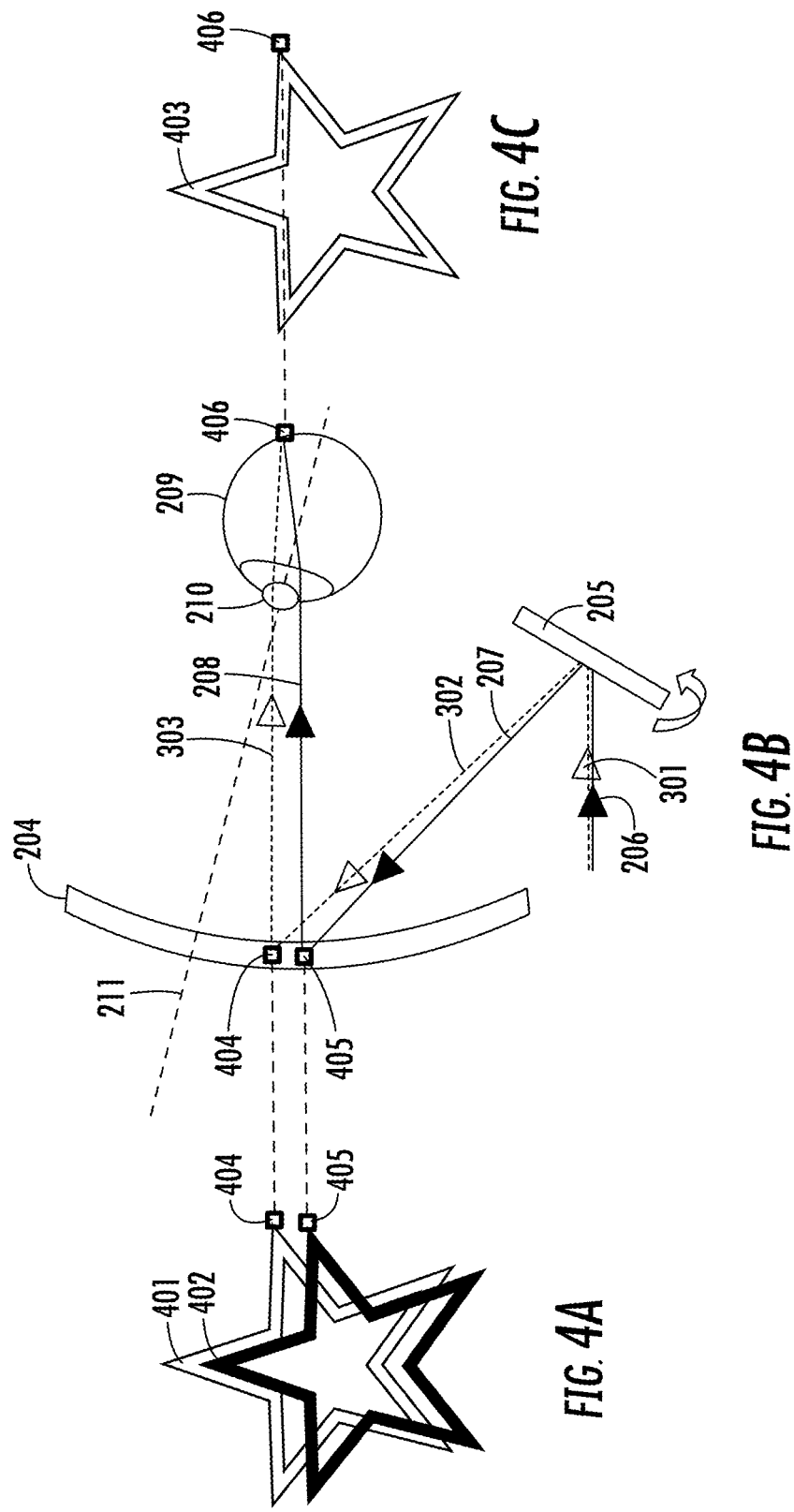

7 POSITIONS    5 POSITIONS    3 POSITIONS

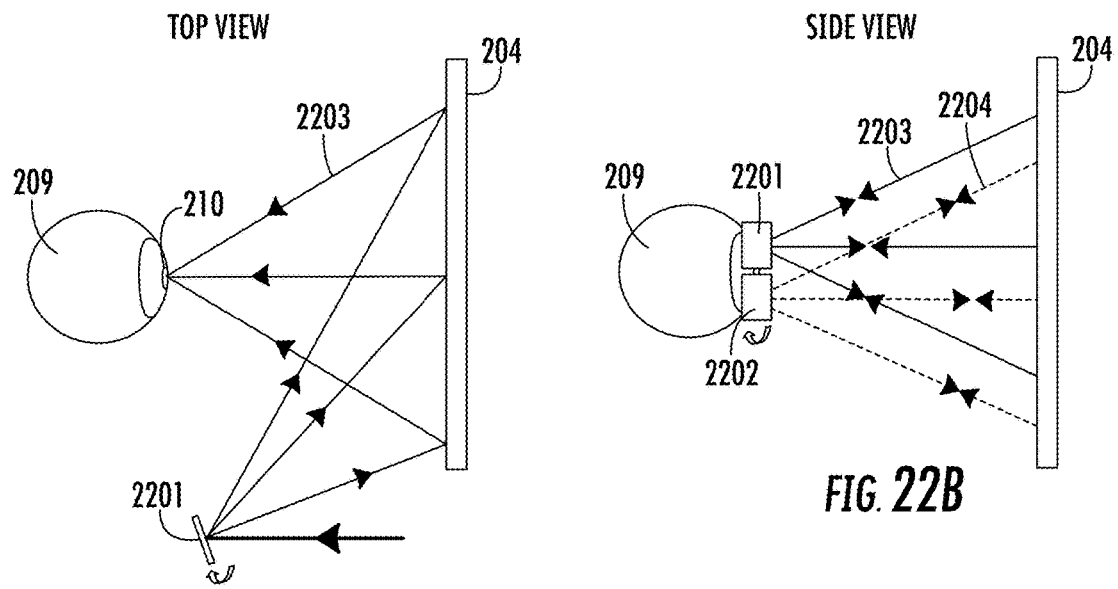
FIG. 22A
FIG. 22B
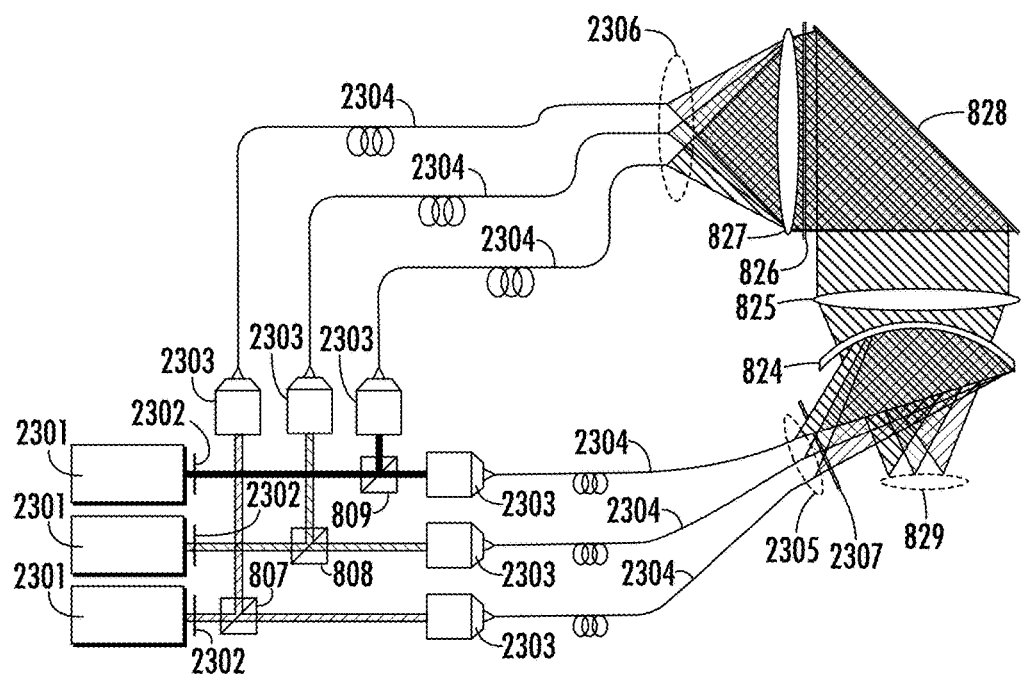
FIG. 23

METHOD AND APPARATUS FOR HEAD WORN DISPLAY WITH MULTIPLE EXIT PUPILS

CROSS-REFERENCE TO RELATED APPLICATIONS

This application is a continuation of, claims the benefit of and priority to previously filed U.S. patent application Ser. No. 14/780,108 filed Sep. 25, 2015, now U.S. Pat. No. 9,846,307 B2, entitled "METHOD AND APPARATUS FOR HEAD WORN DISPLAY WITH MULTIPLE EXIT PUPILS", which is a U.S. national stage entry of PCTIB2014/060134; both of the above are incorporated herein by reference in their entirety.

FIELD OF THE INVENTION

The present invention relates to head-worn displays (HWDs), in particular, those systems that give the possibility to superimpose virtual images onto normal vision using eyewear with built in display capability.

BACKGROUND

The large-scale adoption of consumer mobile computing devices such as smartphones offers new possibilities for human interaction with computers and as well as the surrounding environment. Next generation mobile devices are expected to provide information by displaying it in a different manner than the current hand portable display screen. Advances in projection display technologies are enabling near the eye displays, such as a pair of see through glasses with overlaid information displayed directly to the user.

See-through displays have been used for decades for defense applications. For example, Jet fighter pilots have been using heads-up displays (HUDs) in air-craft and helmet-mounted displays (HMDs) to provide navigational and other critical information to the pilot in his/her field of view. While projection technology is advancing, there is still currently a difficult trade-off between field of view and the bulk and weight in see-through HWDs. In most cases a significant field of view (>30-40 degrees) requires bulky optics making their usage difficult for many applications. Smaller field of view systems have been introduced with more acceptable form-factors, but the challenge remains to create useful implementations of see-through displays with aesthetically pleasing form factors for a wide range of applications and even everyday use.

One primary challenge in the design of HWDs is the expansion of the so-called eyebox of the display. The eyebox is an optical system tolerance to the placement and movement of the wearer's eye. This corresponds closely to the exit pupil of the optical system. The conventional approach in HWDs is to expand the optical system's exit pupil by various means. However this usually leads to a more bulky optical system.

HWDs are often implemented using microdisplay panels, such as LCOS and OLED panel arrays, which are presented to the eye in a pupil forming or non-pupil forming arrangement of imaging optics which allow the wearer to see a distant image of the microdisplay. Another but less common approach is retinal projection. Retinal projection uses a scanning element to raster scan an image directly onto the user's retina. Retinal projection displays originate with the scanning laser ophthalmoscope (SLO) developed in 1980. The technology was later developed into the virtual retinal display, led by Tom Furness at the University of Washington's HITLab in the 90s (Thomas A. Furness et al. "Display system for a head mounted viewing transparency" U.S. Pat. No. 5,162,828, filed 1989), (Thomas A. Furness et al. "Virtual retinal di spay" U.S. Pat. No. 5,467,104, filed 1992). Since then many HWD patents have been filed using MEMS based scanning projectors, i.e. retinal displays. Of particular note are patents owned by the University of Washington and Microvision (a spinoff of University of Washington) who led early efforts to commercialize the virtual retinal display in the mid-late 90s. The majority of this work involved efforts to expand the exit pupil of the system, which is otherwise small due to the low etendue laser source. The prevalent method found in patent literature is the use of a diffractive or diffusing screen to expand the beam, which is then re-collimated before presenting it to the eye (Joel S. Kollin et al, "Virtual retinal display with expanded exit pupil" U.S. Pat. No. 5,701,132, filed 1996). The drawback of this approach is that the beam expansion optics creates added optical bulk with trade-offs similar to other conventional HWD approaches.

There have been methods to create multiple and/or steerable small exit pupils. These methods have used an array of lasers for multiple eyebox locations in conjunction with eye-tracking (M. Tidwell, "Virtual retinal display with scanner array for generating multiple exit pupils", U.S. Pat. No. 6,043,799, filed 1998), (M. Tidwell, "Scanned retinal display with exit pupil selected based on viewer's eye position," U.S. Pat. No. 6,204,829, filed 2000). Systems with steerable exit pupils based on eye-tracking have also been proposed (John R. Lewis et al., "Personal display with vision tracking" U.S. Pat. No. 6,396,461, filed 1998). These systems relied on eye tracking and did not use a method to unify the images produced by the multiple exit pupils.

There have been several HWD implementations using of Holographic Optical Elements (HOEs). Takahashi et al. have applied for a patent for a system using an HOE and Maxwellian view arrangement (Hideya Takahashi et al., "Image Display Unit and Electronic Glasses", U.S. patent application Ser. No. 11/576,830, filed 2005), however the system in this patent does not appear to consider a laser scanning projector, but rather an expanded beam passed through a spatial light modulator. In addition there is no discussion of multiplexing or multiple exit pupils.

The concept of using a microdisplay in conjunction with a single layer hologram as a beam combiner is also known prior art—for example U.S. Pat. No. 3,940,204. From a related journal publication on the work, it was described that aberrations were quite large in these systems. This was largely due to the requirement for a large exit pupil of 12-15 mm at the eye. This creates a larger aperture, "faster" optical system, which is more difficult to control in terms of aberrations. The size of the projector is also directly proportional to the numerical aperture of the beam and the size of the exit pupil at the eye location.

SUMMARY OF THE INVENTION

The present invention provides a method and apparatus to display an image on a person's vision using a display built into eyewear.

In at least one embodiment, the present invention relates to a HWD created using several elements. 1) A scanning projection system that consists of a small etendue source—a laser or light emitting diode (LED), reflected from a resonant micro-electromechanical system (MEMS) scan mirror. For each position of the scan mirror a pixel may be formed on the retina through raster scanning. 2) A volume holographic optical element (HOE) used as a transflector, i.e., a transparent screen that reflects light from a projection system, to redirect light to the eye. The transflector element performs two primary functions. It allows ambient light from the environment to pass through providing normal vision to the user. It also redirects scanned light from the projector to the eye to provide a displayed image on the retina.

In at least one embodiment, the present invention relates to a method for placing a plurality of small exit pupils on the eye with control over their locations. The combination of small and separated exit pupils creates a larger effective eye-box. Alternatively, rather than filling the entire field of view, the exit pupils can be strategically placed for particular view locations.

In at least one embodiment, the transflector is fabricated using a reflective holographic recording technique, where two coherent laser beams at a given wavelength of light and similar intensity interfere. At the given light wavelength, one of the two beams, called the reference beam, is incident on the holographic material with the properties of the scanning projection system, i.e. with incidence angles and positions matching the projection setup. The second beam at the given light wavelength, called the object beam, is incident on the opposite side of the holographic material to produce a reflection hologram. In one embodiment, the object beam is passed through a large focusing lens to produce a focus of the reflection hologram at the eye. Doing so places the exit pupil of the projection system at the center of the entrance pupil for the eye such that all parts of the projected image may be viewable for a given eye location and gaze-angle. In another embodiment, the exit pupil location can be placed not at the entrance pupil of the eye, but at the eye's center of rotation or in between the eye entrance pupil and center of eye rotation.

Further, in at least one embodiment, several separated wavelengths of similar perceived color are used for holographic multiplexing to create multiple exit pupil locations. By using multiple wavelengths with small separations for both the recording and read-out of the hologram, several exit pupil locations can be created with similar colors. The exit pupil locations are created in the hologram writing setup by relay imaging an array of point sources to the eye location, i.e. multiple object beams written simultaneously. In at least one embodiment, this is done using optical fiber facets in a precision arrangement acting as point sources. The point source arrangement of optical fibers is then relay imaged to the eye location with (de)magnification. By projecting the light at similar wavelengths used for recording when the hologram is "read out" by the projector in the HWD, the multiple exit pupils are created. In at least one embodiment, each of the narrowband wavelengths are individually controlled and pre-processed in software before projection to produce spatially shifted and distortion compensated images corresponding to their individual exit pupil location. In this way a single image is created at the eye. In at least one embodiment, direct modulated lasers are beam combined to form the light source. In one embodiment, the light beams are combined coaxially for presentation to the HOE. In another embodiment the light beams are combined with different angles that correspond to the spatial separations of their respective exit pupils. Alternatively in another embodiment multiple LED light sources are spectrally and spatially filtered, and beam combined coaxially or non-coaxially to form the light source. Further, in another embodiment, a broadband light source such as a white-light LED or laser is modulated by an array of spectrally selective modulators, such as electro-absorption or acousto-optic modulators.

Further, in another embodiment, multiplexing red, green, and blue (RGB) light wavelengths for each exit pupil location creates a full color HWD with multiple exit pupils. Doing so requires 3× the individually controllable sources or light bands as the number of exit pupil locations. For example a color single exit pupil design requires 3 individually controllable light bands: one red, one green, one blue. A design with two exit pupil locations requires 6 controllable wave-length bands: two red, two green, and two blue. Similarly a design with 7 exit pupil locations would require 21 light bands with individual control.

In yet another embodiment, the multiple exit pupils are turned on and off to reduce power consumption. Eye tracking is used to determine which exit pupils should be used at any given moment.

In another embodiment, multiple exit pupils are created in a HWD that uses a micropanel display element, rather than scanning mirror. Wavelength multiplexing in a HOE is used to separate the light of different wavelengths at the eye to create multiple exit pupils. Image pre-processing of the various sources is used to align the apparent images of the different exit pupil locations.

In another embodiment, multiple exit pupils are created in a scanning mirror HWD using angular multiplexing in the HOE transflector. Multiple scanning mirrors are used to create differences in angle of incidence at the HOE, which redirects the light to multiple exit pupils. Image pre-processing of the various sources is used to align the apparent images of the different exit pupil locations.

In another embodiment, multiple contiguous field of view regions are created in a HWD that is non-pupil forming, meaning that projected light is essentially collimated at the HOE transflector. The non-pupil forming approach allows more easily for a large eyebox to be created, but can be limited in field of view by the HOE transflector. Therefore, multiplexing in the HOE is used to create multiple fields of view to enlarge the overall combined field of view. Image pre-processing of the various sources is used to align the apparent images of the different fields of view.

In another embodiment, a scanning mirror HWD captures images of the retina and other parts of the eye by detecting the reflected signal from the eye in a confocal imaging arrangement. In one embodiment, this return signal is used for eye tracking by correlating the detected image to gaze angle. In another embodiment, tracking of the eye's position is done by detecting and comparing the return signal intensity for a plurality of exit pupils, wherein comparison of the return signal indicates which exit pupil is best aligned to the eye.

In another embodiment, a broadband source is divided into multiple discrete spectral emission bands in a scanning mirror HWD. Each of the discrete spectral bands then creates an independent and spatially separated exit pupil at the eye.

In another method of the invention, a narrowband diffusing element is used as the HWD transflector, and a spatial light modulator is used as the light projection element, where the spatial light modulator is used to phase conjugate the light's wavefront after the scattering transflector for a low aberration image at the eye.

In another embodiment, the HWD of this invention is used as a non invasive method for health monitoring via the measurement of physiological parameters through the eye.

For example, heart rate, glucose level, ocular pressure, level of stress, the nature or onset of diseases by imaging the retina at regular intervals.

The present invention applies to both monocular and binocular implementations of a HWD. Unless otherwise noted the descriptions will cover the monocular arrangement with extension to a binocular arrangement requiring a replication of the optics and processing for both eyes.

The present invention is not limited to HWDs. The method and device structure described can also be applied to head-up displays (HUDs) see through display systems placed at a larger distance from the eye.

Accordingly, in a first aspect, the invention provides a method for displaying an image viewable by an eye, the image being projected from a portable head worn display. The method comprises steps of: emitting a plurality of light beams of wavelengths that differ amongst the light beams; directing the plurality of light beams to a scanning mirror; modulating in intensity each one of the plurality of light beams in accordance with intensity information provided from the image, whereby the intensity is representative of a pixel value within the image; scanning the plurality of light beams in two distinct axes with the scanning mirror to form the image; and redirecting the plurality of light beams to the eye using a holographic optical element acting as a reflector of the light beams, whereby the redirecting is dependent on the wavelength of the light beam, to create for each light beam an exit pupil at the eye that is spatially separated from the exit pupils of the other light beams.

In a further preferred embodiment the step of emitting the plurality of light beams further comprises creating a first bundle of a determined number of the plurality of light beams by selecting the corresponding wavelengths of those light beams to be comprised in a specific spectral band within a first given color as perceived by human vision, wherein each of the light beams in the first bundle is associated with its exit pupil that is spatially separated from the exit pupils of the other light beams of the first bundle.

In a further preferred embodiment the step of emitting the plurality of light beams further comprises creating a second and a third bundle of light beams, each bundle corresponding to a separate spectral band within respectively a second given color and a third given color as perceived by human vision, wherein inside the second and the third bundle respectively the light beams are associated with the exit pupils of the light beams of the first bundle, thereby creating for each of the exit pupils three light beams corresponding to the first, second and third given colors for a full color image.

In a further preferred embodiment the method for displaying an image viewable by an eye further comprises applying an image registration and a distortion correction to the image for each of the light beams, to align the displayed image produced by the plurality of light beams in accordance to a location of the exit pupil for each light beam.

In a further preferred embodiment the method for displaying an image viewable by an eye further comprises spatially arranging the exit pupils formed by the plurality of light beams to form an enlarged area in which the eye is aligned to the portable head worn display for viewing of the image.

In a further preferred embodiment the step of directing the plurality of light beams to the scanning mirror further comprises combining the plurality of light beams coaxially, both spatially and angularly, at the scanning mirror, whereby significant angular differences between the light beams at the eye produced by positioning of the individual exit pupils are corrected by image processing.

In a second aspect the invention provides a method for displaying an image viewable by an eye, the image being projected from a portable head worn display. The method comprises steps of: emitting a plurality of light beams of wavelengths that differ amongst the light beams; modulating in intensity each one of the plurality of light beams in accordance with intensity information provided from the image, whereby the intensity is representative of a pixel value within the image; redirecting the plurality of light beams to the eye using an optical element acting as a reflector of the light beams, whereby the redirecting is dependent on the wavelength of the light beam, to create for each light beam an exit pupil at the eye.

In a further preferred embodiment the step of emitting the plurality of light beams further comprises creating a first bundle of a determined number of the plurality of light beams by selecting the corresponding wavelengths of those light beams to be comprised in a specific spectral band within a first given color as perceived by human vision, wherein each of the light beams in the first bundle is associated with its exit pupil that is spatially separated from the exit pupils of the other light beams of the first bundle.

In a further preferred embodiment the step of emitting the plurality of light beams further comprises creating a second and a third bundle of light beams, each bundle corresponding to a separate spectral band within respectively a second given color and a third given color as perceived by human vision, wherein inside the second and the third bundle respectively the light beams are associated with the exit pupils of the light beams of the first bundle, thereby creating for each of the exit pupils three light beams corresponding to the first, second and third given colors for a full color image.

In a further preferred embodiment the method for displaying an image viewable by an eye further comprises applying an image registration and a distortion correction to the image for each of the light beams, to align the displayed image produced by the plurality of light beams in accordance to a location of the exit pupil for each light beam.

In a further preferred embodiment the method for displaying an image viewable by an eye further comprises spatially arranging the exit pupils formed by the plurality of light beams to form an enlarged area in which the eye is aligned to the portable head worn display for viewing of the image.

In a further preferred embodiment the step of redirecting the plurality of light beams, the optical element is a holographic optical element.

In a third aspect the invention provides a method of producing an optical element for use in the method for displaying an image viewable by an eye, comprising recording a holographic optical element with a plurality of hologram writing lasers closely matched to the wavelengths of the plurality of light beams, and whereby the beams of each of the writing lasers are arranged spatially in a hologram recording setup to match the spatial orientation of the exit pupils to be subsequently created by the portable head worn display.

In a further preferred embodiment the beams of each of the writing lasers are arranged spatially by means of optical fibers.

In a further preferred embodiment the method for displaying an image viewable by an eye further comprises deactivating selected ones of the plurality of light beams associated to each of the exit pupils, in correspondence to the eye's position at a given moment, whereby eye tracking information is used to deactivate misaligned exit pupils to reduce device power consumption.

In a further preferred embodiment the method for displaying an image viewable by an eye further comprises spatially arranging the exit pupils formed by the plurality of light beams, whereby each individual light beam forms a plurality of spatially separated exit pupils, to create multiple regions of interest that are not viewed simultaneously by the eye, each with a subset field of view and associated plurality of exit pupils within a larger overall field of view.

In a further preferred embodiment the step of modulating in intensity of each one of the plurality of light beams comprises projecting from a panel microdisplay.

In a further preferred embodiment the method for displaying an image viewable by an eye further comprises directing the plurality of light beams to a scanning mirror; and scanning the plurality of light beams in two distinct axes with the scanning mirror to form the image.

In a further preferred embodiment the method for displaying an image viewable by an eye further comprises combining the plurality of light beams coaxially, both spatially and angularly, whereby significant angular differences between the light beams at the eye produced by positioning of the individual exit pupils are then corrected by image processing.

In a further preferred embodiment the method for displaying an image viewable by an eye further comprises combining the plurality of light beams with angular differences between the light beams such that the angular content of one of the light beams at the exit pupils is substantially similar to the angular content of any other one of the light beams, thereby reducing the requirements for image processing, whereby remaining angular differences between the light beams at the eye produced by positioning of the individual exit pupils are then corrected by positioning of the individual exit pupils are then corrected by image processing.

In a further preferred embodiment the plurality light beams are combined with angular differences between the light beams by means of a telecentric lens which combines the light beams at the exit pupil of the telecentric lens, whereby a two-dimensional arrangement of a plurality of light sources that emit the light beams of wavelengths that differ amongst the light beams are collimated and combined.

In a further preferred embodiment the plurality of light sources that emit the light beams of wavelengths that differ amongst the light beams are spatially and spectrally filtered by a combination of a further telecentric lens, diffracting optical element and apertures for the light beams.

In a further preferred embodiment the diffracting optical element is one of the following list: a diffraction grating, a volume holographic element.

In a fourth aspect the invention provides a method for displaying an image viewable by an eye, the image being projected from a portable head worn display. The method comprises steps of: emitting a plurality of light beams; directing each of the plurality of light beams to a corresponding spatially separated scanning mirror; modulating in intensity each one of the plurality of light beams in accordance with intensity information provided from the image, whereby the intensity is representative of a pixel value within the image; scanning each one of the plurality of light beams in two distinct axes with the corresponding one of the plurality of spatially separated scanning mirrors to form the image; and redirecting the plurality of light beams to the eye using an optical element acting as a reflector of the light beams, whereby the redirecting is dependent on the incidence angle of the light beam on the optical element, to create for each light beam an exit pupil at the eye that is spatially separated from the exit pupils of the other light beams.

In a further preferred embodiment the method for displaying an image viewable by an eye further comprises applying an image registration and a distortion correction to the image for each of the light beams, to align the displayed image produced by the plurality of light beams in accordance to a location of the exit pupil for each light beam.

In a further preferred embodiment the method for displaying an image viewable by an eye further comprises spatially arranging the exit pupils formed by the plurality of light beams to form an enlarged area in which the eye is aligned to the portable head worn display for viewing of the image.

In a further preferred embodiment the step of emitting the plurality of light beams further, three light beams of separate visible wavelengths are directed to each scanning mirror and combined to form one of the exit pupils, thereby creating for each of the exit pupils three light beams for a full color image.

In a further preferred embodiment the step of redirecting the plurality of light beams, the optical element is a holographic optical element.

In a fifth aspect the invention provides a method of producing an optical element for use in the method for displaying an image viewable by an eye further comprises. The method further comprises: recording a holographic optical element with a plurality of hologram writing lasers closely matched to the wave lengths of the plurality of light beams, and whereby the beams of each of the writing lasers are arranged spatially in a hologram recording setup to match the spatial and angular orientation of the exit pupils and projection source points to be subsequently created by the portable head worn display.

In a further preferred embodiment the beams of each of the writing lasers are arranged spatially by means of optical fibers.

In a further preferred embodiment the method for displaying an image viewable by an eye further comprises deactivating selected ones of the plurality of light beams associated to each of the exit pupils, in correspondence to the eye's position at a given moment, whereby eye tracking information is used to deactivate misaligned exit pupils to reduce device power consumption.

In a further preferred embodiment the method for displaying an image viewable by an eye further comprises arranging the exit pupils formed by the plurality of light beams, whereby each individual light beam forms a plurality of spatially separated exit pupils, to create multiple regions of interest that are not viewed simultaneously by the eye, each with a subset field of view and associated plurality of exit pupils within a larger overall field of view.

In a sixth aspect the invention provides a method for displaying an image viewable by an eye, the image being projected from a portable head worn display. The method comprises steps of: emitting a plurality of light beams; modulating in intensity each one of the plurality of light beams in accordance with intensity information provided from the image, whereby the intensity is representative of a pixel value within the image; redirecting the plurality of substantially collimated light beams to the eye without creating an optical exit pupil at the eye using an optical element acting as a reflector of the light beams, whereby the redirecting is dependent on the angle of incidence and wavelength of the light beam, creating a plurality of subset fields of view which make up an overall field of view in ensemble at the eye.

In a further preferred embodiment in the step of redirecting the plurality of light beams, the optical element is a holographic optical element.

In a further preferred embodiment the method for displaying an image viewable by an eye further comprises applying an image registration and a distortion correction to the image for each of the light beams, to align the images of the subset fields of view to form in a contiguous fashion, the overall field of view in ensemble.

In a further preferred embodiment in the step of emitting the plurality of light beams, three light beams of separate visible wavelengths per subset field of view, are combined thereby creating for each of the subset fields of view, three light beams for a full color image.

In an eighth aspect the invention provides a method for obtaining physiological information from the eye by projecting and capturing an image from a portable head worn display. The method comprises the steps of: emitting a plurality of light beams of wavelengths that differ amongst the light beams; focusing the plurality of light beams through a lens onto a pinhole aperture; directing the plurality of light beams from the pinhole aperture to a scanning mirror; modulating in intensity each one of the plurality of light beams in accordance with intensity information provided from the image, whereby the intensity is representative of a pixel value within the image; scanning the plurality of light beams in two distinct axes with the scanning mirror to form the image; redirecting the plurality of light beams to the eye using an optical element on the spectacle lens acting as a reflector of the light beams, whereby the redirecting is dependent on the wavelength and angle of the light beam, to create for each light beam an exit pupil at the eye that is spatially separated from the exit pupils of the other light beams; focusing the redirected plurality of light beams onto a surface of the eye; reflecting the focused plurality of light from said surface of the eye back through the system to the pinhole aperture; and directing the reflected plurality of light beams through a beam splitting element to a detector, whereby the intensity is representative of the confocal image of the surface of the eye where the plurality of light beams were focused.

In a further preferred embodiment the pinhole aperture is replaced by an optical fiber used to transport the light to a different location.

In a further preferred embodiment light is reflected back at the same wavelengths as the plurality of light beams via scattering from the eye's surface.

In a further preferred embodiment light is reflected back at shifted wave-lengths as compared to the plurality of light beams via fluorescence from the eye's surface.

In a further preferred embodiment light is reflected back at shifted wave-lengths as compared to the plurality of light beams via Raman scattering from the eye's surface.

In a seventh preferred embodiment the invention provides a method of producing an optical element for use in the method for displaying an image view-able by an eye further comprising recording a holographic optical element with a plurality of hologram writing lasers closely matched to the wavelengths of the plurality of light beams, and whereby the beams of each of the writing lasers are arranged spatially in a hologram recording setup to match the spatial and angular orientation of the subset fields of view to be subsequently created by the portable head worn display.

In a further preferred embodiment the method for displaying an image viewable by an eye further comprises applying an image registration and a distortion correction to the image for each of the light beams, to align the images of the subset fields of view to form in a contiguous fashion, the overall field of view in ensemble.

In a further preferred embodiment in the step of emitting the plurality of light beams, three light beams of separate visible wavelengths per subset field of view, are combined thereby creating for each of the subset fields of view, three light beams for a full color image.

In an eighth aspect the invention provides a method for obtaining physiological information from the eye by projecting and capturing an image from a portable head worn display. The method comprises the steps of: emitting a plurality of light beams of wavelengths that differ amongst the light beams; focusing the plurality of light beams through a lens onto a pinhole aperture; directing the plurality of light beams from the pinhole aperture to a scanning mirror; modulating in intensity each one of the plurality of light beams in accordance with intensity information provided from the image, whereby the intensity is representative of a pixel value within the image; scanning the plurality of light beams in two distinct axes with the scanning mirror to form the image; redirecting the plurality of light beams to the eye using an optical element on the spectacle lens acting as a reflector of the light beams, whereby the redirecting is dependent on the wavelength and angle of the light beam, to create for each light beam an exit pupil at the eye that is spatially separated from the exit pupils of the other light beams; focusing the redirected plurality of light beams onto a surface of the eye; reflecting the focused plurality of light from said surface of the eye back through the system to the pinhole aperture; and directing the reflected plurality of light beams through a beam splitting element to a detector, whereby the intensity is representative of the confocal image of the surface of the eye where the plurality of light beams were focused.

In a further preferred embodiment the pinhole aperture is replaced by an optical fiber used to transport the light to a different location.

In a further preferred embodiment light is reflected back at the same wavelengths as the plurality of light beams via scattering from the eye's surface.

In a further preferred embodiment light is reflected back at shifted wave-lengths as compared to the plurality of light beams via fluorescence from the eye's surface.

In a further preferred embodiment light is reflected back at shifted wave-lengths as compared to the plurality of light beams via Raman scattering from the eye's surface.

In a further preferred embodiment light is reflected back at shifted wave-lengths as compared to the plurality of light beams via non-linear phenomenon at the eye's surface.

In a further preferred embodiment the optical element is a volume holographic optical element.

In a ninth aspect the invention provides a method for obtaining physiological information from the eye by projecting and capturing an image from a portable head worn display. The method comprises steps of: emitting a plurality of light beams of wavelengths that differ amongst the light beams; focusing the plurality of light beams through a lens onto a single mode core of a multimode dual cladding optical fiber; directing the plurality of light beams from the multimode dual cladding optical fiber to a scanning mirror; modulating in intensity each one of the plurality of light beams in accordance with intensity information provided from the image, whereby the intensity is representative of a pixel value within the image; scanning the plurality of light beams in two distinct axes with the scanning mirror to form the image; redirecting the plurality of light beams to the eye using an optical element on the spectacle lens acting as a reflector of the light beams, whereby the redirecting is dependent on the wavelength and angle of the light beam, to create for each light beam an exit pupil at the eye that is spatially separated from the exit pupils of the other light beams; focusing the redirected plurality of light beams onto a surface of the eye; reflecting the plurality of light beams from said surface of the eye back through the system to the multimode core of said multimode dual cladding optical fiber; and directing the reflected plurality of light beams through a beam splitting element to a detector, whereby the intensity is representative of the confocal image of the surface of the eye where the plurality of light beams were focused.

In a further preferred embodiment light is reflected back at the same wavelengths as the plurality of light beams via scattering from the eye's surface.

In a further preferred embodiment light is reflected back at shifted wave-lengths as compared to the plurality of light beams via fluorescence from the eye's surface.

In a further preferred embodiment light is reflected back at shifted wave-lengths as compared to the plurality of light beams via Raman scattering from the eye's surface.

In a further preferred embodiment light is reflected back at shifted wave-lengths as compared to the plurality of light beams via non-linear phenomenon at the eye's surface.

In a further preferred embodiment the optical element is one of the following list: a kinoform diffractive optical element, a curved reflective element with a frequency selective response.

In a further preferred embodiment the method for obtaining physiological information from the eye further comprises focusing the plurality of light beams to different depths of the eye, whereby the wavelengths of the light beams deter-mine which structures of the eye are imaged.

In a further preferred embodiment invisible infrared light is used for the confocal measurement so as not to disturb the visible function of the head worn display.

In a further preferred embodiment the beams are separated at the detector by filters which is any one from the following list: interference type, dichroic, holographic.

In a further preferred embodiment the method for obtaining physiological information from the eye further comprises: capturing a plurality of gaze specific images of the eye for eye tracking calibration; processing the plurality of gaze specific images of the eye for feature extraction; forming a database correlating gaze positions to the extracted features; capturing a new gaze specific image of the eye for gaze determination; correlating the features of this image against images in the database; and classifying the image by correlation to a particular gaze angle, for eye tracking in real time.

In a further preferred embodiment the method for obtaining physiological information from the eye further comprises: capturing the reflected intensity from the plurality of light beams that make up the plurality of exit pupils at the eye, whereby the eye's gaze position is correlated to the relative intensity of the plurality of beams that make up the spatially separated exit pupils at the eye.

In a tenth aspect the invention provides a method for displaying an image viewable by an eye, the image being projected from a portable head worn display. The method comprises steps of: emitting at least one light beam of broad spectrum; slicing the spectrum of the at least one light beam into a plurality of discrete spectral emission bands each separated by a spectral zone of no light; directing the plurality of light beams to a scanning mirror; modulating in intensity each one of the at least one light beams in accordance with intensity information provided from the image, whereby the intensity is representative of a pixel value within the image; scanning the at least one light beams in two distinct axes with the scanning mirror to form the image; and redirecting the at least one light beams to the eye using a holographic optical element acting as a reflector of the light beams, whereby the redirecting is dependent on the wavelength content and angle of the light beam, to create for each of the discrete spectral emission bands an exit pupil at the eye that is spatially separated from the exit pupils of the other discrete spectral emission bands.

In a further preferred embodiment the method for displaying an image viewable by an eye further comprises deflecting the at least one light beam after the scanning mirror by a dispersive optical element, whereby the dispersive optical element separates the at least one light beam angularly into a plurality of light beams corresponding to the number of discrete spectral emission bands.

In a further preferred embodiment the method for displaying an image viewable by an eye further comprises emitting three light beams with separated spectral bands within each of the red, green and blue color ranges, such that the combination of one light beam from each color range creates a perceived color hue with the hue dependent on the relative strength of the three combined light beams.

In a further preferred embodiment the method for displaying an image viewable by an eye further comprises spatially arranging the plurality of exit pupils formed by the plurality of light beams to form an enlarged area in which the eye can be aligned to the optical system for viewing of the displayed image.

In an eleventh aspect the invention provides a method for displaying an image viewable by an eye, the image being projected from a portable head worn display. The method comprises steps of: emitting at least one light beam from a coherent source; directing the at least one light beam to a spatial light modulator having a phase pattern which provides a first wavefront; redirecting the at least one light beam to the eye using a diffuse scattering reflector on the spectacle lens, whereby the first wavefront is reflected by the diffuse scattering reflector providing a second wavefront entering the eye and forming a low aberration image on the retina.

In a further preferred embodiment the coherent light source is a surface emitting laser (VCSEL), a point source LED or a laser diode.

In a further preferred embodiment the spectacle lens is composed of a first and a second transparent optically joined elements, wherein the first element has a first index of refraction has one side which is scattering with visible light and a second side which is smooth and non scattering and on which a reflective coating is deposited, and the second element has a second index of refraction equal to said first index of refraction and having a smooth and non scattering side.

In a further preferred embodiment the spatial light modulator is a phase only modulator, an amplitude only modulator or both.

In a twelfth aspect the invention provides a method for obtaining physiological information from the eye by projecting and capturing an image viewable by an eye, the image being projected from a portable head worn display the method comprises steps of: emitting at least one light beam from a coherent source; directing the at least one light beams to a spatial light modulator having a phase pattern which provides a first wave-front; redirecting the at least one light beams to the eye using a diffuse scattering reflector on the spectacle lens, whereby the first wave-front is reflected by the diffuse scattering reflector providing a second wave-front entering the eye and forming a low aberration spot on a surface of the eye; scanning the spot on the retina by providing an appropriate phase pattern to the SLM; and retrieving the diffuse reflected light by the retina in a confocal manner to form an image of said surface.

In a further preferred embodiment said surface is the retina.

In a thirteenth aspect, the invention provides a system for displaying an image viewable by an eye, the image being projected from a portable head worn display. The system comprises: a multiple exit pupil head worn display system for implementing the method for displaying an image viewable by an eye; and a front mounted camera that captures a scene and provides a processed image of the scene to the head worn display.

In a further preferred embodiment the processed image can be any of (a) a zoomed imaged, (b) edge-enhanced image (c) contrast enhanced image (d) a distorted image or a combination of (a) to (d).

In a further preferred embodiment the eye has a loss of light receptors in the fovea such as an eye suffering from age related macular degeneration.

In a further preferred embodiment the processed image is displayed in the periphery around the fovea of the eye.

In a further preferred embodiment the eye has a loss of light receptors in the periphery around the fovea.

In a further preferred embodiment the processed image is displayed in the fovea.

In a fourteenth aspect, the invention provides a device for redirecting an image projected from a portable head worn display to the eye. The device comprises: embedded small kinoform mirrors in a transparent thermo polymer matrix to locally redirect at least one incident light beams to the eye; and a thin film reflective coating on the kinoform mirrors which is spectrally and angularly selective to allow for the at least one light beam from the projector to be separated into multiple exit pupils at the eye, while simultaneously allowing substantial ambient light from the surroundings to pass through to the eye.

In a fifteenth aspect, the invention provides a system for displaying binocular images to two eyes, the images being projected from two portable head worn displays. The system comprises: multiple exit pupil projection modules on each side of a pair of spectacles; multiple exit pupil holographic reflectors on both the spectacle lenses; an eye tracking system for both eyes based on reflected light from the eye; a front facing camera to capture the scene in front of the user; and three-dimensional images produced by changes to the binocular images based on information from the eye tracking system.

In a sixteenth aspect, the invention provides a method for creating and maintaining alignment between a projector and a spectacle lens holographic optical element in a multiple exit pupil head worn display. The method comprises steps of: aligning the projector and the holographic optical element on a rigid material connection structurally maintaining positions and angle between the optical elements; and attaching and positioning the rigid structure on a pair of conventional spectacles.

In a further preferred embodiment the conventional spectacles are non-prescription glasses or sunglasses; or, prescription glasses or sunglasses.

In a further preferred embodiment the rigid material connection is placed and attached on the inside, or the outside of the conventional spectacles.

These and other aspects of the invention will be explained further in the following detailed description in conjunction with the drawings.

BRIEF DESCRIPTION OF THE DRAWINGS

FIG. 1A is a drawing of a hardwired monocular head worn display according to an embodiment of this invention;

FIG. 1B is a drawing of a wireless monocular head worn display according to an embodiment of this invention;

FIG. 3A is an optical schematic of the scanned retinal display aligned to the eye with one of two exit pupils formed by wavelength multiplexing according to an embodiment of this invention;

FIG. 3B is an optical schematic of FIG. 3A with the eye rotated and aligned to the second of two exit pupils formed by wavelength multiplexing;

FIG. 4A is an illustration of the projected image with preprocessing shift between two image components related to two exit pupils;

FIG. 4B is an optical schematic of the scanned retinal display with two identical pixels for two different exit pupils projected on the transflector merging into one single pixel on the retina;

FIG. 4C is an illustration of the simultaneous perceived image on the retina from two exit pupils with image preprocessing shown in FIG. 4A to align the images according to an embodiment of this invention;

FIG. 22A is a top view optical schematic of the scanned retinal display with two scanning mirrors to create two separated exit pupils;

FIG. 22B is a side view optical schematic of the scanned retinal display with two scanning mirrors to create two separated exit pupils;

FIG. 23 is an optical schematic of the simultaneous hologram writing setup for three exit pupils using angular multiplexing with one center wavelength according to an embodiment of this invention;

DETAILED DESCRIPTION

Figure 2B:
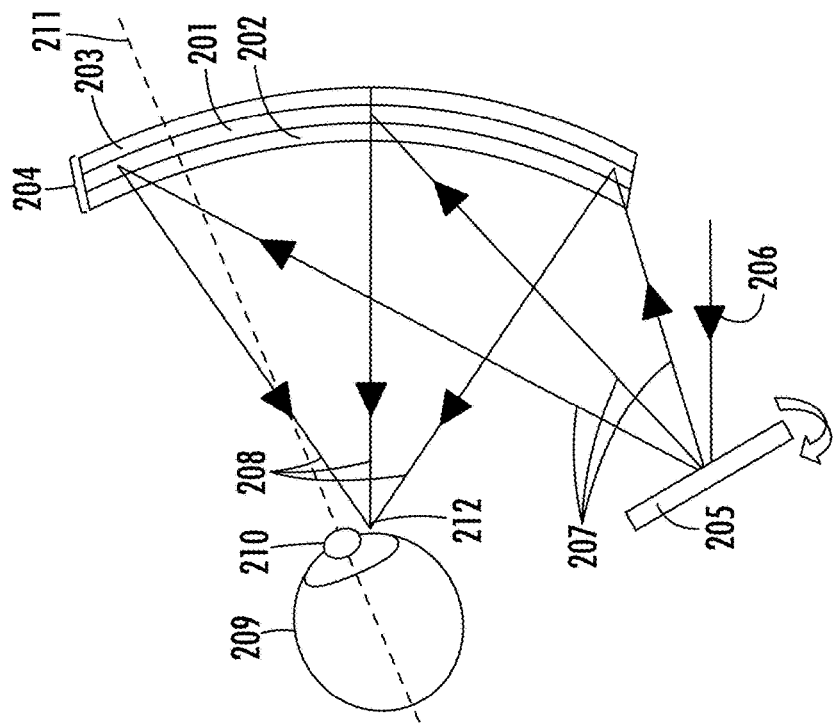
FIG. 2B is an optical schematic of FIG. 2A, with the eye rotated and misaligned to the single exit pupil.

The techniques, apparatus, materials and systems as described in this specification can be used to implement a HWD based on a scanning projector and holographic transflector, and can also be applied to head-up displays (HUDs)—see through display systems placed at a larger distance from the eye.

In at least one embodiment of the invention a head worn display creates a scanned image directly on the user's retina using a scanning mirror projector. The exit pupil of the scanning mirror is placed at the entrance pupil of the eye using a transflector element, which can be, but is not limited to a holographic optical element (HOE). In addition to reflecting the display light toward the eye, the transflector also acts to efficiently transmit light from the environment to the eye, allowing for the display to be added to natural vision. This is often referred to as "augmented reality" or sometimes "mixed reality". Additionally, the described invention allows for an effectively expanded eyebox by multiplexing the HOE to create multiple exit pupils arranged to mimic an enlarged eyebox.

FIG. 1A and FIG. 1B show two possible embodiments of the invention. FIG. 1A is a drawing of a possible embodiment of the present invention showing simple and lightweight eyewear integrated with the scanning display. A layer of holographic material is coated onto one of the lenses of the glasses 101. In at least one embodiment, the HOE can be a photopolymer coated on the lens and subsequently holographically recorded or in another embodiment, the photopolymer can be embedded into (i.e., sandwiched) between two surfaces of the spectacle lens. The holographic material then acts to redirect the display light into the eye, while transmitting the light from the environment. In one arm of the eyewear near the temple of the user, a scanning mirror or panel microdisplay projector 102 projects the image onto the holographic transflector 101. In one embodiment the light source, power electronics and driver electronics are separately or altogether moved off the head in a small box 103 connected to the eyewear through a patch cord 104 which can be detached at the glasses by a removable connector 105. Moving these components off the head has the advantage of allowing the eyewear to be simple, lightweight, discrete, cosmetically attractive and socially acceptable. Further, the eyewear can be disconnected from the separate module allowing a user to indicate to others whether or not the personal display device is active. This is an attractive feature in a social context considering that a consumer head worn display will likely also include sound and video recording devices that may interfere with personal privacy and social interaction. In other embodiments with tight integration of the components, the light sources, power and driver components could alternatively be placed completely within the eyewear. FIG. 1B is a drawing of another possible embodiment where the light source, power electronics and driver electronics are contained completely within the eyewear 106. Further, in other embodiments light can be projected into both eyes in a binocular fashion using two sets of projectors and HOEs on both spectacle lenses.

Figure 2A:
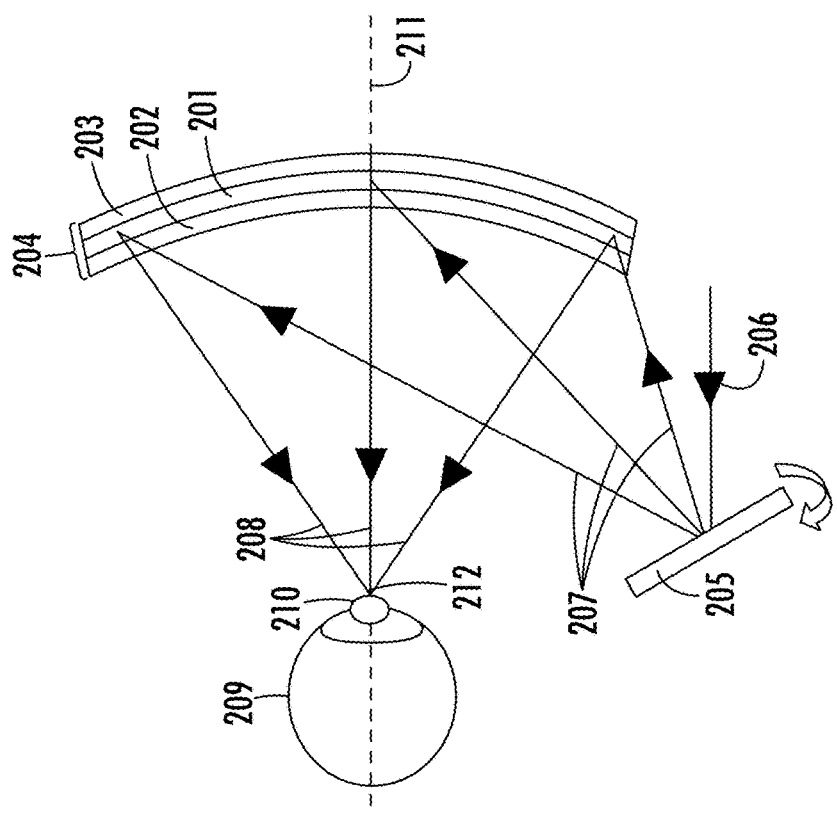
FIG. 2A is an optical schematic of the scanned retinal display aligned to the eye with a single exit pupil according to an embodiment of this invention.

In at least one embodiment, light travels through the optical system as depicted in FIG. 2A. FIG. 2A is a schematic of the optical arrangement of a scanning projection based head worn display for a single exit pupil of the scanning mirror 212. Light of at least one wavelength 206 is incident on a scanning mirror 205, which scans the light beam in angle 207 with intensity modulated to correspond to a digital image. The holographic transflector 204, which in at least one embodiment includes a recorded holographic material 201 sandwiched between two outer protective layers 202 and 203, reflects the projected light 207 into diffracted light 208 toward the center of the eye entrance pupil 210 of the forward gazing eye 209. Here the eye line of sight 211 is aligned to the center of the exit pupil of the scanning mirror 212. The limitation with this arrangement is in the rotation tolerance of the eye. FIG. 2B shows that an eye can rotate out of the view of the single exit pupil. As such, a single exit pupil arrangement is suitable for small field of view displays where the user aligns their eye to view the displayed image. In FIG. 2B, the eye line of sight 211 is misaligned to the single exit pupil 212. The holographic transflector 204 reflects the projected light toward the center of the entrance pupil of the forward gazing eye but mismatch between the eye's entrance pupil 210 and the exit pupil 212 prevents the image from being seen.

In at least one embodiment of the invention, multiple exit pupils effectively expand the system's eyebox. FIG. 3A and FIG. 3B show an example of a multiple exit pupil arrangement, with two exit pupils created at two spatially separated positions near the eye. In FIG. 3A and FIG. 3B two exit pupils are shown for simplicity, but additional exit pupils can be used in a two-dimensional arrangement. Multiple exit pupils can be used to create a larger effective eyebox for the eye, and allow for large FOV images to be scanned by the eye. In at least one embodiment, multiplexing the holographic element with different wavelengths of light creates the multiple exit pupils. Volume holographic elements exhibit "selectivity" meaning that the hologram written for one wavelength of light and angle of incidence is independent of another hologram written at a sufficiently different wavelength or incidence angle. In this way, sources of different center wavelength or incidence angle can be used to produce multiple independent exit pupils without crosstalk thus producing an enlarged effective eyebox. Further, the multiple exit pupils can be created with separated wavelengths of similar color in terms of human perception. For example, several exit pupil locations can be created using several different red light sources with sufficiently different center wavelengths. The required separation depends on the spectral selectivity of the HOE to prevent crosstalk. FIG. 3A is a schematic of the optical arrangement for two exit pupils 212 and 304 along the vertical axis created by holographic multiplexing of two light beams 206 and 301 of different wavelengths. These light beams are reflected by the scanning mirror 205, which scans the light beam in angles 207 and 302 with intensity modulated to correspond to a digital image. The holographic transflector 204 reflects the projected light 207 and 302 into diffracted light 208 and 303 toward two exit pupil locations 212 and 304 at the plane of the eye, providing a tolerance to eye rotation. Here the eye line of sight 211 is aligned 211 to the center of the central exit pupil 212. FIG. 3B is a schematic of the optical arrangement for two exit pupils along the vertical axis with the eye line of sight 211 rotated but still capturing light from one of the exit pupils 304.

Figure 4D:
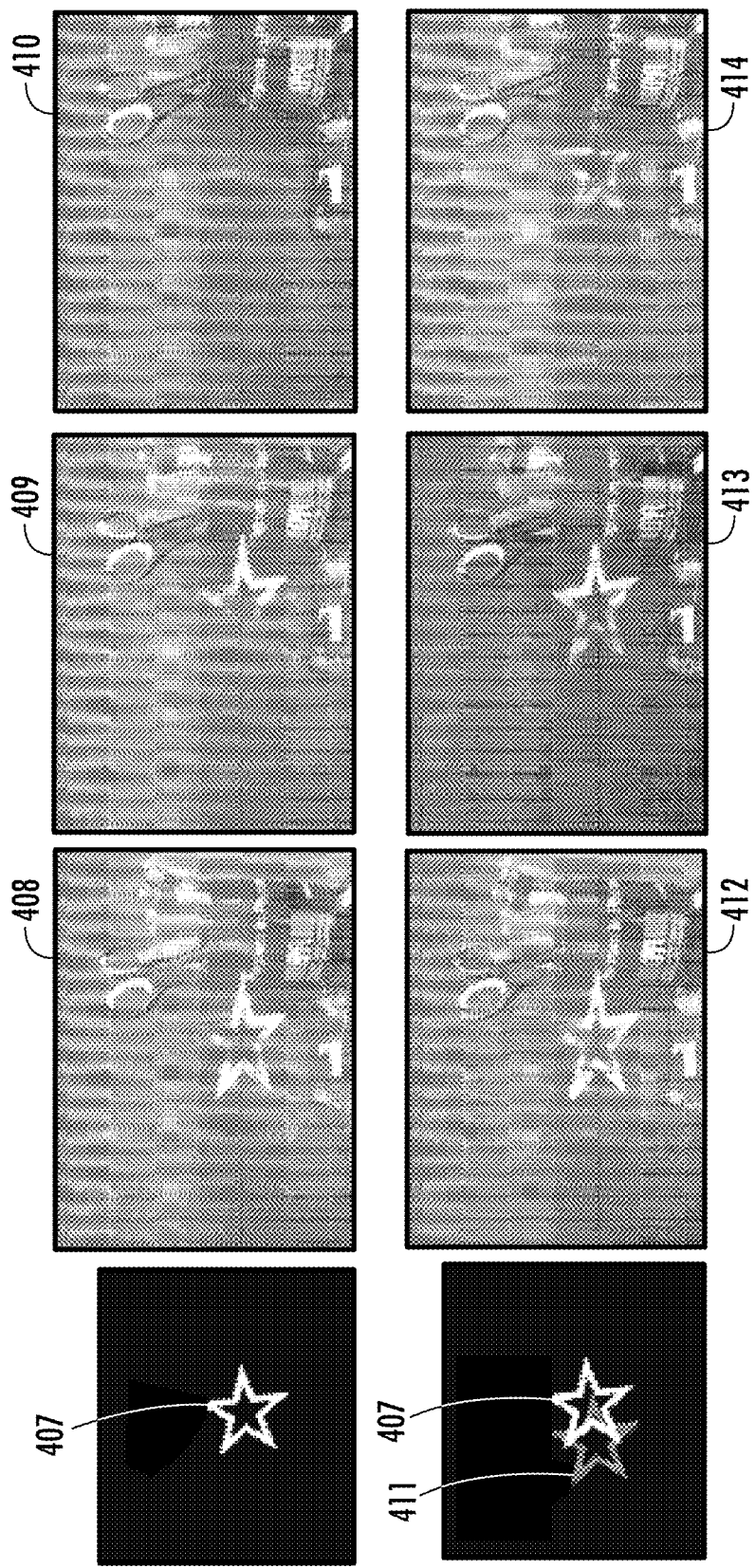
FIG. 4D is a demonstration of the enlarged eyebox and image pre-processing where pictures are obtained with a rotating camera combined with a focusing lens mimicking an artificial eye.

When multiple exit pupils are created with the holographic method described in this invention, light from a particular position of the scanning mirror, equivalently a pixel of the image, will appear on the retina at different positions for the different wavelengths corresponding to different angular content of the light of the different exit pupils. In at least one embodiment shown in FIG. 4, this difference is corrected by preprocessing the images that are projected for each wavelength corresponding to each individual exit pupil. When the individual light sources are independently controlled, each position of the scanning mirror can project independent pixel data for the different wavelength sources corresponding to the shifted positions of the exit pupils. As shown in FIG. 4A, the required image processing for laterally shifted exit pupils is primarily a relative image shift between the projected images for each of the different wavelengths sources. Additional geometric corrections may also be applied, for example to correct for distortion. When properly adjusted, the images from the different wavelengths and exit pupil locations will coincide to form a single image on the retina. FIG. 4 is an illustration of the pre-processing shifts and image registration necessary to align on the retina the images of the different exit pupils. In this example, FIG. 4A shows two images 401 and 402 from two different exit pupils arranged vertically. By projecting images 401 and 402 shifted from each other as in FIG. 4A, a single apparent image 403 is produced on the retina, as shown in FIG. 4C. Observing FIG. 4B, pixels 404 and 405 content the information of the same image pixel for each exit pupil. By projecting pixels 404 and 405 on the transflector with a separation distance similar to the separation distance of the two corresponding exit pupils, pixels 404 and 405 merge into one single pixel 406 on the retina. Real systems can have additional shifts across 2-dimensions. Real systems may also benefit from further pre-processing of the images to correct nonlinearities such as distortion to improve alignment of the images. A demonstration of the enlarged eyebox and image pre-processing is shown in FIG. 4D. The image 407 with a single wave-length component corresponding to a single exit pupil was projected onto the transflector, which in turn reflected the image back into a camera combined with a focusing lens mimicking an artificial eye. Picture 408 was taken with the camera aligned with the single exit pupil, whereas picture 409 was taken with the camera partly misaligned with the single exit pupil and picture 410 was taken with the camera further misaligned with the single exit pupil. Picture 408, 409 and 410 show that the projected image disappears as the camera is misaligned with the single exit pupil. The image 411 with a different wavelength component than image 407 corresponding to another exit pupil than the one obtained from image 407 was projected together with image 407 onto the transflector, which in turn reflected the image back into a camera combined with a focusing lens mimicking an artificial eye. Picture 412 was taken with the camera aligned with the exit pupil of image 407, whereas picture 413 was taken with the camera partly misaligned with the exit pupil of images 407 and 408. Picture 414 was taken with the camera further misaligned with the single exit pupil but aligned with the exit pupil of image 408. Picture 412, 413 and 414 demonstrate that the eyebox can be enlarged through the use of multiple exit pupils.

Figure 5:
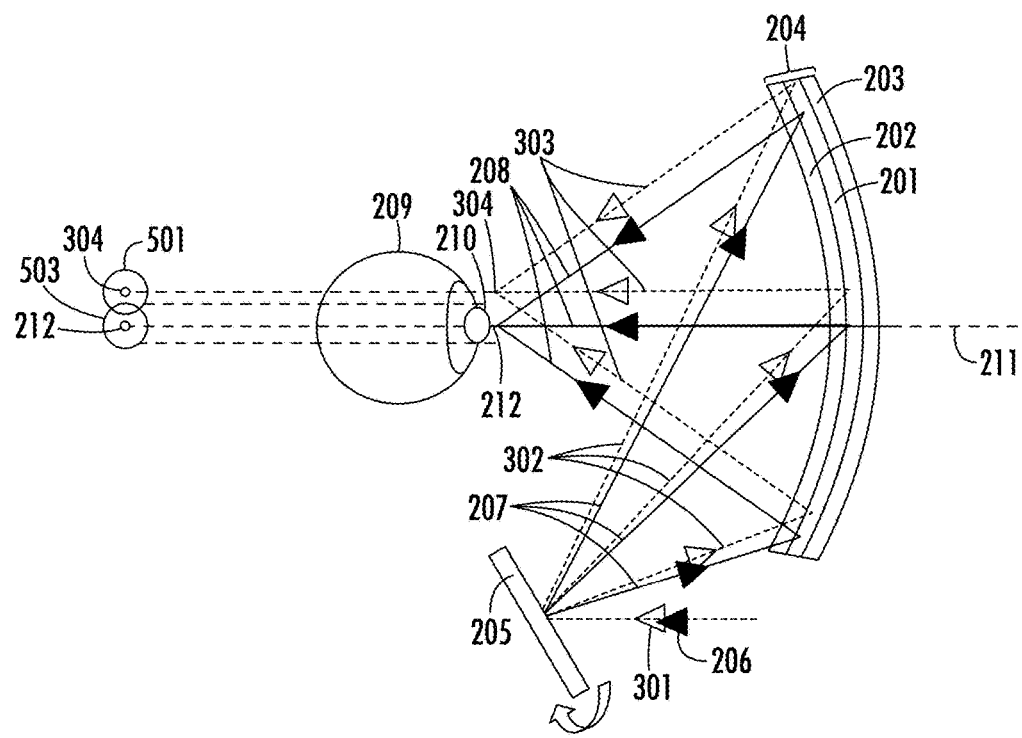
FIG. 5 is an optical schematic of the scanned retinal display with two exit pupils and an associated illustration of the exit pupil arrangement and eyebox overlap according to an embodiment of this invention.
Figure 6:
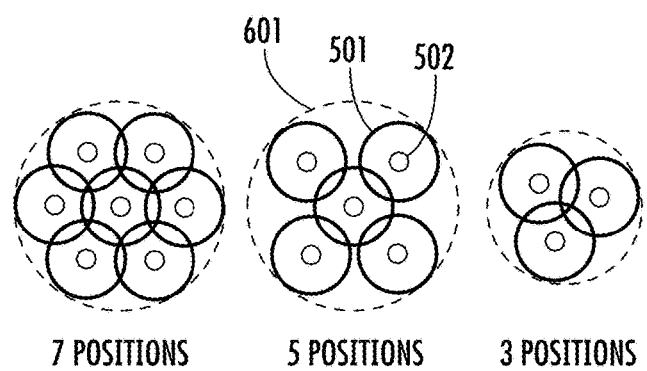
FIG. 6 is an illustration of three examples of exit pupil arrangements and eyebox overlaps according to three different embodiments of this invention.

FIG. 5 is an illustration of how the individual exit pupils are related to the "eyebox" of the head worn display. In this example the system of FIG. 3A and FIG. 3B is shown with two exit pupils. Each exit pupil 212 and 304 creates a rotation tolerance for the eye, where the image can be viewed while light enters the eye's entrance pupil 210. The size of each individual eyebox 501 and 503 is approximately equal to the size of the eye's entrance pupil 210 when the exit pupil is located at the entrance pupil of the eye. In this figure, two exit pupils are used to create a seamlessly enlarged effective eyebox in the vertical direction. The number and geometric arrangement of multiple exit pupils created at the eye can be widely varied and a large number of combinations are possible. FIG. 6 is an illustration of three possible arrangements made with multiple exit pupils 502. As more exit pupils 502 are added with additional source wavelengths, the eyebox 501 covered by the multiple exit pupil's coverage improves approaching that of a larger synthetic exit pupil 601. Several example arrangements are shown for emphasizing particular locations on the screen such as the center and corners (3, 5 and 7 positions). Although small and spatially separated exit pupils 502 are shown, the corresponding eyebox 501 for each exit pupil— shown as larger black circles—will be larger than the individual exit pupils and roughly the size of the eye's entrance pupil. If the individual eyeboxes associated with each exit pupil location overlap one another the overall effective eyebox can be made continuous without gaps in the viewable image space. Individual exit pupils are shown as small circles, but can range in size depending on the size of the scanned beam. The invention includes but is not limited to these arrangements. For larger field of view systems, the most desirable solution may be a large number of exit pupils to fully cover the desired eyebox, i.e., 5 and 7 exit pupils in FIG. 6. To maximize the fill factor of the eyeboxes, the different exit pupils should be arranged within a triangular lattice. Alternatively, simpler solutions can be found by explicitly selecting which parts of the human vision and eye rotation the multiple exit pupils cover. For example with 2 exit pupils, a single corner and the center of the eye's rotation can be used. This would be useful for displaying information in one corner of the person's field of vision viewable with both foveal and peripheral vision.

The exit pupils can be non-overlapping in field of view or they can be overlapping.

Figure 7:
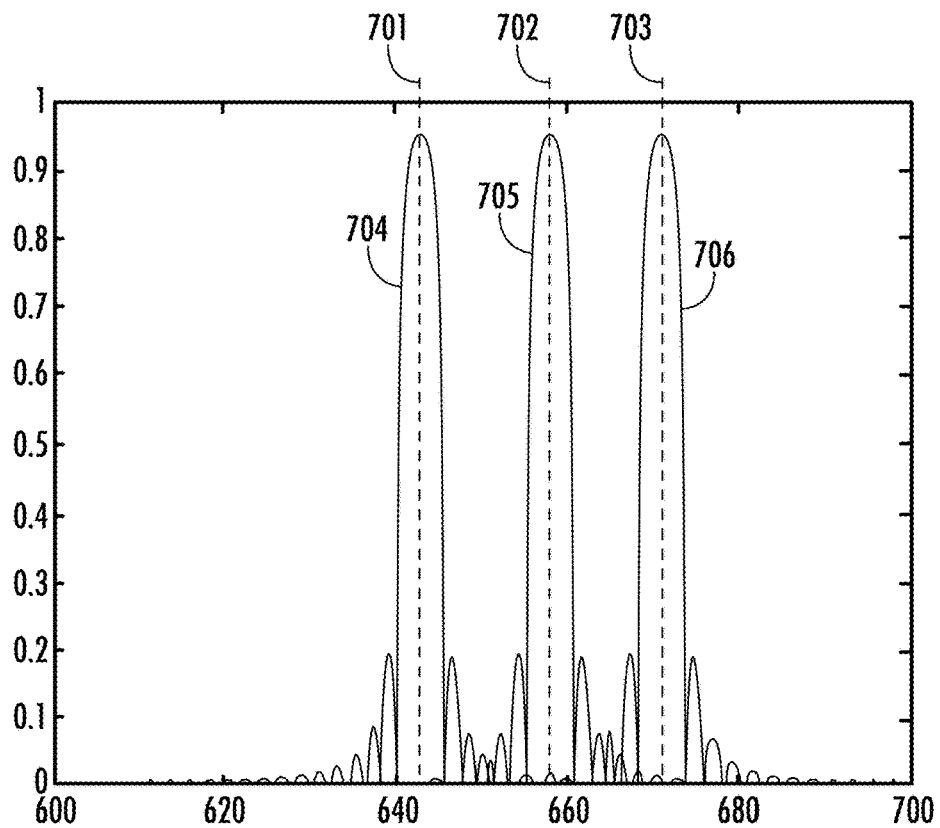
FIG. 7 is an illustration of the wavelength selectivity of a volume holographic element according to an embodiment of this invention.

Volume holograms can be effectively wavelength multiplexed provided that hologram is selective enough to prevent crosstalk between adjacent channels. The selectivity of the hologram can be tuned controlling refractive index variation of the material and material's thickness. This selectivity applies to both the wave-length of the reconstruction light, and also the incidence angle of the reconstruction light with respect to the recording light. In the design of a multiplexed head worn display there is subsequently a trade-off between selectivity and tolerance to spectral and angular misalignment between the hologram recording and the read-out when used as a head worn display. FIG. 7, showing the diffraction efficiency of holographic transflectors in ordinate versus wavelength in abscissa as calculated by an analytic mathematical model, is an illustration of the wavelength selectivity of a volume holographic element made in a photopolymer. In this example three holograms are multiplex recorded at three center wavelengths in the red: 643 nm—reference sign 701—, 658 nm—reference sign 702—and 671 nm—reference sign 703—using a modeled refractive index variation of 0.0075 and a 60 μm hologram thickness. The recorded holograms show high wavelength selectivity 704, 706 and 706 for low crosstalk readout. In this simulation two plane waves at 0° and 45° from each side of the hologram record the hologram. The hologram is subsequently read-out at 45°. The refractive index considered is 1.5. From this modeled example with the three red wavelengths chosen, the crosstalk is approximately 16% for the 16 μm photopolymer, but reduces to <1% for the thicker 60 μm photopolymer. In yet another embodiment of the invention, the display can be made full color by using red, green and blue light sources. For a full color display, the required number of individually controlled light bands is 3× the number of desired exit pupil locations. For example, 3 light bands for one exit pupil and 21 light bands for 7 exit pupils.

Figure 8:
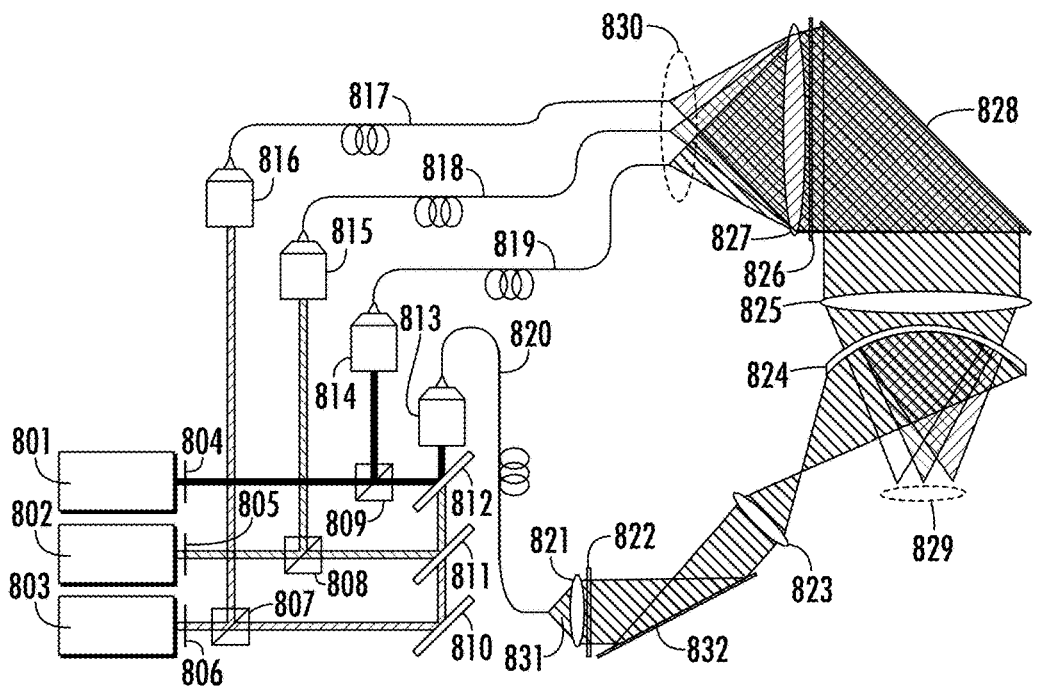
FIG. 8 is an optical schematic of the simultaneous hologram writing setup for three exit pupils using three different center wavelengths according to an embodiment of this invention.

In at least one embodiment of the invention, the holographic transflector is recorded using an optical holographic recording setup shown in FIG. 8. This setup creates a reflection hologram on the curved HOE. FIG. 8 is a schematic of the holographic writing setup shown with three wavelengths of similar color but different center wavelengths 801, 802 and 803 for three exit pupil locations 829 relative to a holographic material 824 collocated with the eye in the head worn display. After passing through half wave plates 804, 805 and 806, the beams from the lasers are split with polarizing beam splitters 807, 808 and 809 and coupled by focusing optics 813, 814, 815 and 816 into fibers 817, 818, 819 and 820. The object beams 830 pass through lenses 827 and 825, are reflected by mirror 828, and pass through a polarizer 826 before passing through the holographic material 824 and focusing at the exit pupil locations 829. The reference beams 831 pass through lenses 821 and 823, a polarizer 822 and are reflected by a mirror 832 before passing through the holographic material 824. In the reference beams 831, all laser wavelengths are combined and presented to the HOE using the angles of incidence and positions of the scanning projector. In the object beams 830, the lasers are coupled into individual optical fibers, which are spatially arranged and relay imaged through the HOE to create the multiple exit pupils at the eye location. Although three laser sources are shown, the setup can be scaled for additional wavelengths. The recording setup of FIG. 8 can be used as a "simultaneous" recording setup, where the multiplexed holograms are written at the same time. Simultaneous recording has advantages in terms of holographic efficiency homogeneity and a one-shot recording schedule. Other embodiments of the invention could alternatively use sequential recording to multiplex holograms, where multiple recordings are done one after another. Another method is to record each holographic film with one wavelength or a set of wavelengths and subsequently place the films on top of each other.

Figure 9A:
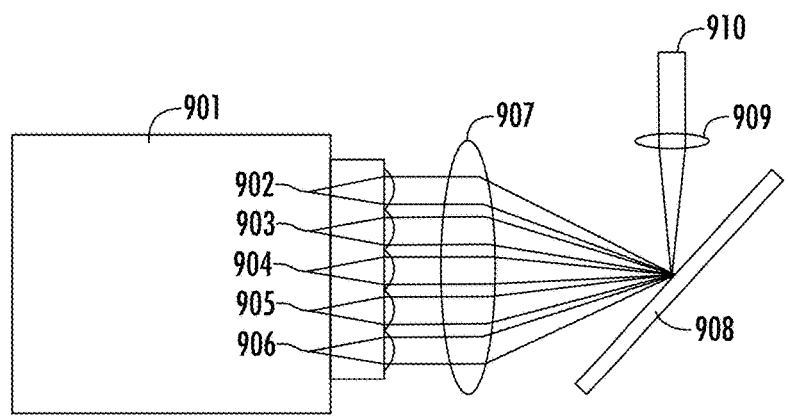
FIG. 9A is an optical schematic of a coaxial spectral beam combiner using a diffractive element according to an embodiment of this invention.
Figure 9B:
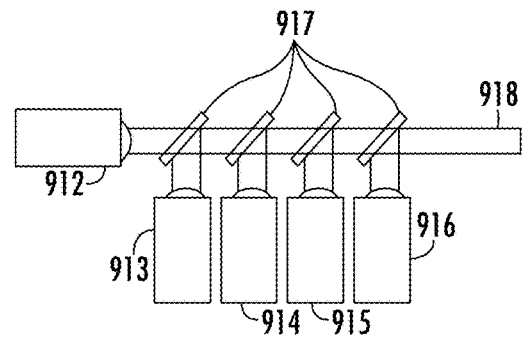
FIG. 9B is an optical schematic of a coaxial spectral beam combiner using dichroic beam splitters according to an embodiment of this invention.
Figure 9C:
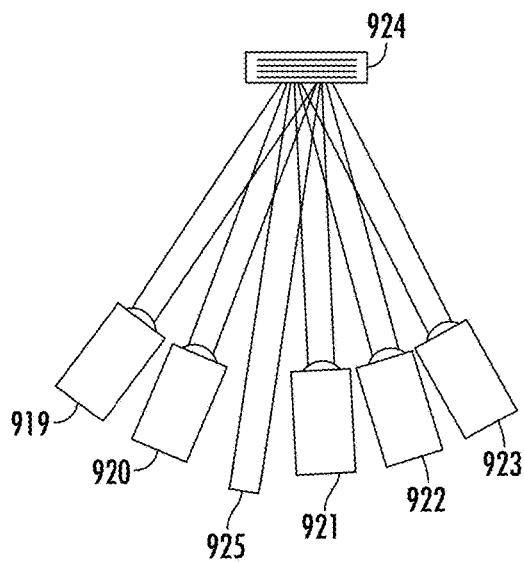
FIG. 9C is an optical schematic of a coaxial spectral beam combiner using a volume holographic element according to an embodiment of this invention.
Figure 9D:
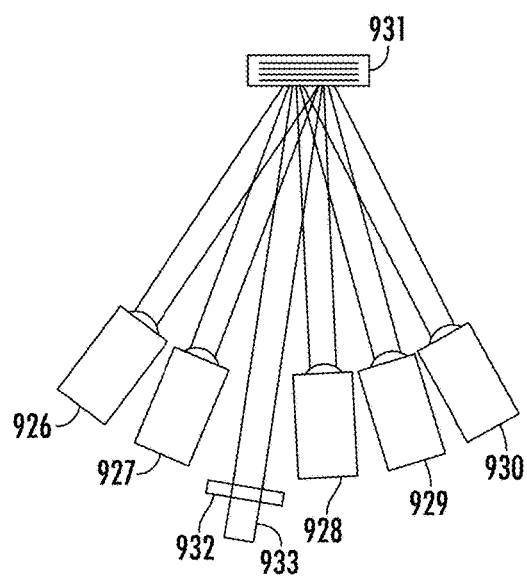
FIG. 9D is an optical schematic of a coaxial spectral beam combiner using a volume holographic element and external cavity according to an embodiment of this invention.

In at least one embodiment of the head worn display light sources of different wavelengths are beam combined coaxially for projection from the scanning projector. FIG. 9A is a schematic of a diffractive method for beam combining multiple LED or light sources of different center wavelengths 902, 903, 904, 905 and 906. These sources may be contained within a single controlled source 901. A lens 907 focuses laterally separated beams before reflecting from a diffractive element 908, which serves to co-align the beams of different wavelength before being focused by a lens 909 for a collimated output 910. FIG. 9B is a schematic of a dichroic beam combiner for collimated light sources of different center wave-lengths 912, 913, 914, 915 and 916. Collimated beams from light sources of different wavelengths are co-aligned using dichroic beam splitters 917 for a collimated output 918. FIG. 9C is a schematic of a volume holographic beam combiner for collimated light sources of different wavelengths. Light sources of different wavelengths 919, 920, 921, 922 and 923 are coaligned by a volume holographic element 924 for an axially combined beam 925. FIG. 9D is a schematic of a volume holographic beam combiner using an external cavity to create a multi-wavelength laser source. Each of the sources 926, 927, 928, 929 and 930 has an antireflection coating to prevent lasing within its internal cavity, and incident onto a holographic beam combiner 931. Instead, an external partially reflective mirror 932 forms a cavity for all sources for collimated output 933. The advantage to this approach is decreased sensitivity to temperature variations.

Figure 10:
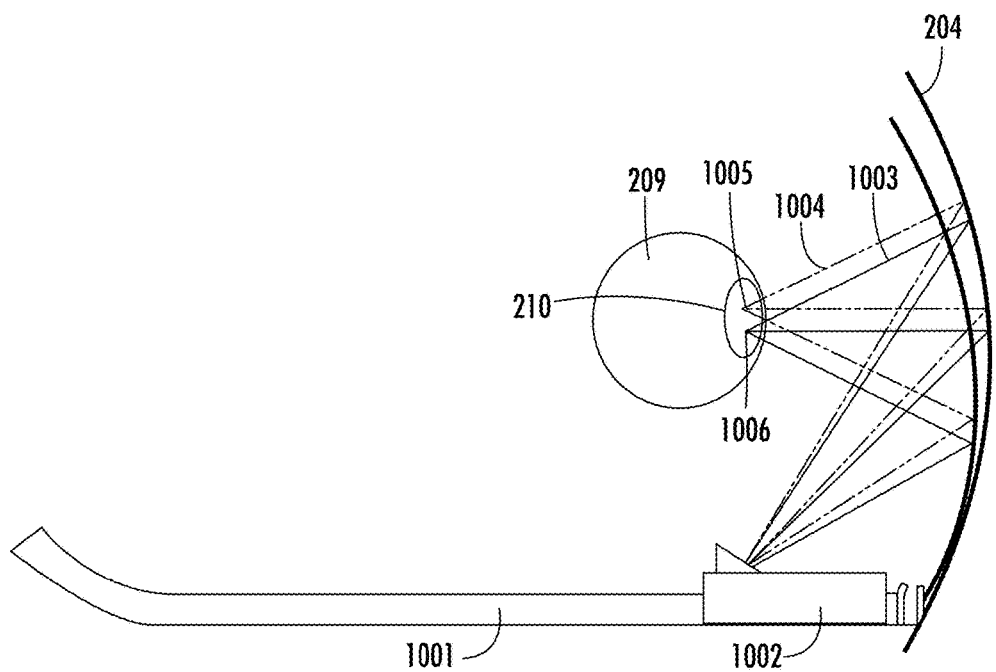
FIG. 10 is an optical schematic of the scanned retinal display on an eyewear frame using angular separation of the light beams to form two exit pupils from two different wavelength sources according to an embodiment of this invention.

In at least one embodiment, the present invention relates to a head worn display with wavelength separated light sources that are combined in a non-coaxial way to create relative angle shifts between light from each source after leaving the scanning micromirror. Light from independent sources with appropriately separated wavelengths can be multiplexed in wavelength in the holographic transflector to produce spatially separated exit pupils (and equivalently spatially separated eyeboxes) at the eye. If light from the sources is coaxially combined, then significant preprocessed digital image shifts are required to align the apparent images from the different exit pupils at the eye. However, if additional angular separations are used to replace most of the large preprocessed image shifts that were necessary to align the apparent image at the eye by creating the shifts optically, digital preprocessed image shifts can be mostly and potentially completely eliminated depending on the optical correction of the projection optics and precision of the optical alignment. With imperfect correction of optical distortion or imperfect alignment, the images of the different exit pupils can be aligned using small relative shifts and relative image warps (pre-compensated distortion correction) to form a well-aligned single apparent image to the eye. This approach has the advantage of saving pixels and image area, which are lost when significantly large preprocessed image shifts are required. FIG. 10 shows a scanning projector based head worn display on an eyewear frame 1001 that creates two exit pupils 1005 and 1006. In this illustration both exit pupils are contained within a single large entrance pupil 210 of the eye 209. Two independent sources of different center wavelengths are scanned by scanning projector 1002 creating shifted beams, which are reflected by a multiplexed holographic transflector 204 to the eye 209. The chief rays 1003 and 1004 of the two sources are shown in solid and dashed lines for the two wavelengths. Three mirror scan positions are shown representing the center and extremes of the scan range. Any misalignment present between the two images caused by slight misalignments or differences in the distortion created by the optics can be corrected by independent pre-processing of the images. Although shown for two wavelengths in two-dimensions for simplicity, this arrangement can be directly extended for additional exit pupils (wavelengths) with a three-dimensional arrangement.

Figure 11:
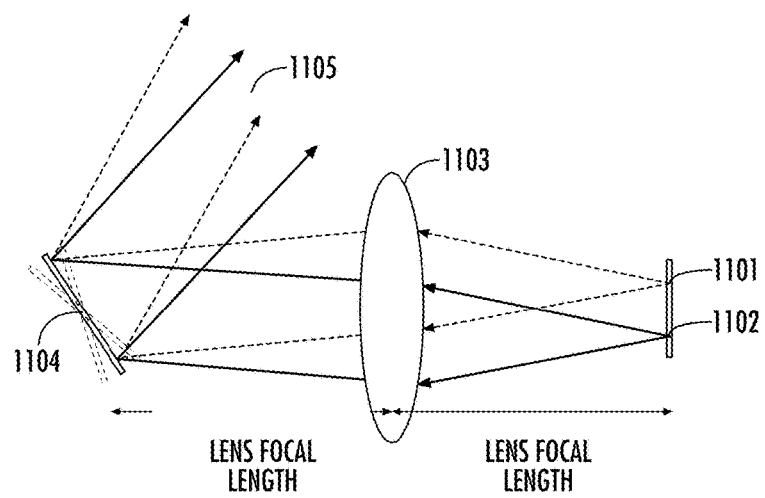
FIG. 11 is an optical schematic of the scanning projection module with non-coaxially combined beams according to an embodiment of this invention.
Figure 12:
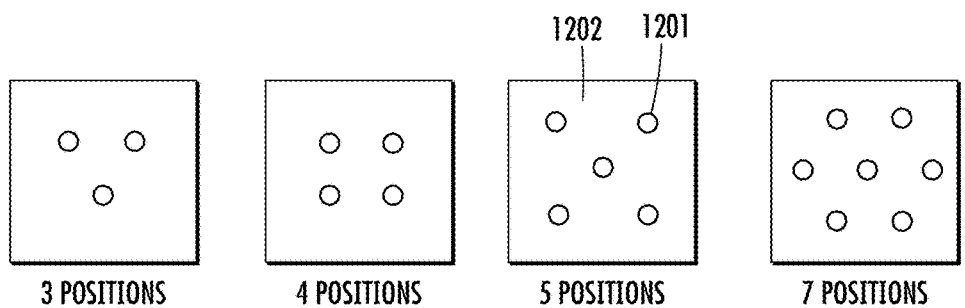
FIG. 12 illustrates four examples of light source arrangements of different wave-lengths to form spatially separated exit pupils and non-coaxially combined beams according to four different embodiments of this invention.
Figure 13A:
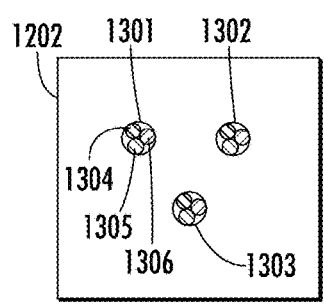
FIG. 13A is an illustration of a light source with red, green and blue emitters at each of three locations to form spatially separated exit pupils and non-coaxially combined beams according to an embodiment of this invention.
Figure 13B:
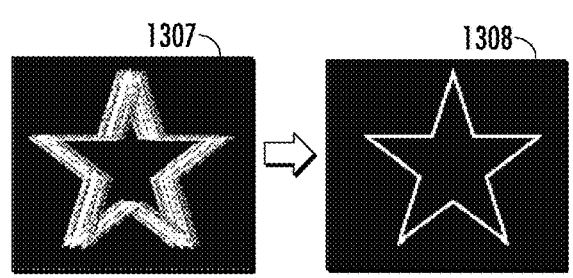
FIG. 13B is an illustration of the apparent image at the eye from the light source of FIG. 13A, without processing (left) and with preprocessing to align the images (right).
Figure 14:
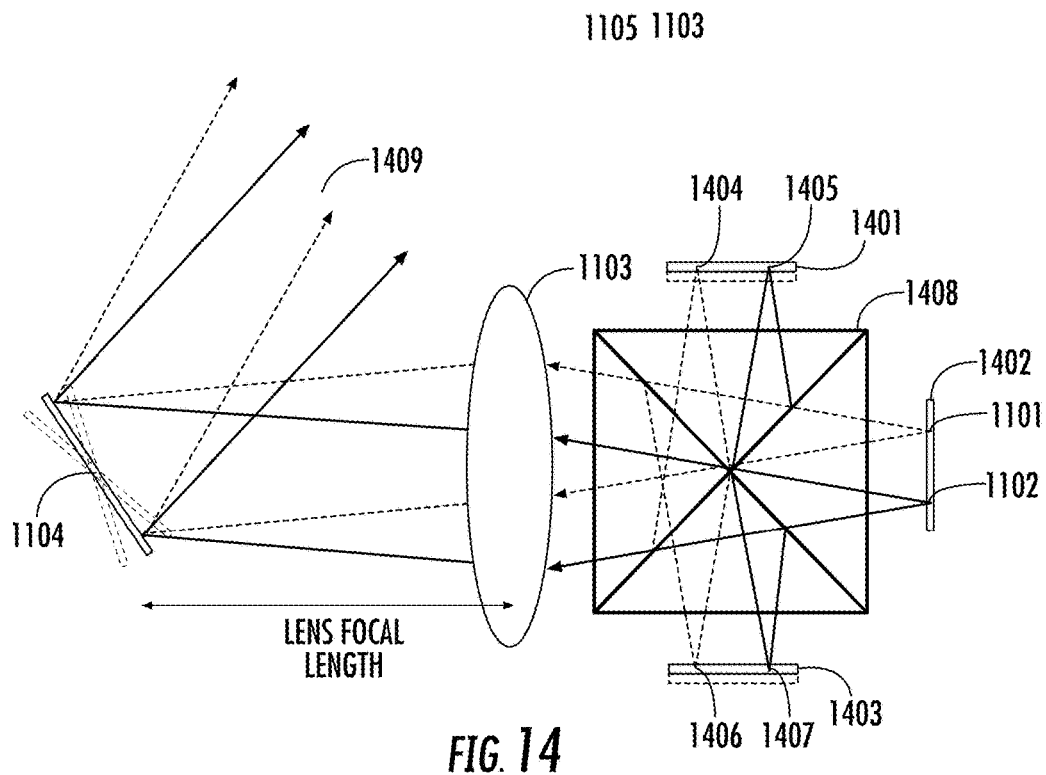
FIG. 14 is an optical schematic of the scanning projection module with non-coaxially combined beams from red, green and blue sources according to an embodiment of this invention.

In at least one embodiment, the source combiner to create non-coaxially combined light sources consists of a spatially distributed ensemble of light sources and a telecentric combiner lens which combines the sources at the exit pupil of the telecentric lens which coincides with the scanning micromirror. FIG. 11 shows an optical apparatus to combine the multiple wavelength sources with predetermined angles to present them to the hologram. In this illustration two sources are shown, 1101 and 1102 of different center wavelengths. The sources are accurately placed and arranged on a single plane such that their spatial positions are transformed into angular separations by a telecentric lens 1103 which has its exit pupil collocated with the scanning micromirror 1104. After reflection from the micromirror 1104, light 1105 travels to a projection lens (not shown) to focus the light for presentation to the hologram transflector such that the light is collimated or nearly collimated at the eye. The angles between the separate sources are designed such that the preprocessed image shifts necessary to align the different images from each exit pupils at the eye is minimized. The sources are arranged with precision alignment such that their orientation creates the necessary angular separation after leaving the micromirror to minimize image processing shifts. These sources can be arranged in a variety of orientations including but not limited to those shown in FIG. 12. FIG. 12 shows four possible source arrangements that could be used with the apparatus of FIG. 11. Each source emitter 1201 in this case can be similar in apparent colour, red for example, but separated in wave-length from its neighbours; or a combination of red, green and blue as shown in FIG. 13A. In at least one embodiment, the sources can be surface mount emitters such as but not limited to vertical cavity surface emitting lasers (VCSELs), LEDs, Superluminescent LED's (SLED's) or resonant cavity LEDs (RCLEDs) of different wavelengths which are aligned with precision in a single electronic package using a precision pick and place method. In another embodiment, broadband sources are created and spatially arranged using a monolithic fabrication method and then modified to narrow their bandwidth using wafer scale spectral filters and optics. Further, in at least one embodiment, a full color exit pupil is created by closely spacing red, green and blue sources for each exit pupil location in a single electronic package. FIG. 13A shows an embodiment of the invention to extend the angularly shifted source of FIG. 12 to full colour. An emitter ensemble 1202 is shown with three separated emitter positions 1301, 1302 and 1303 as in the far left example in FIG. 12. For each emitter positions, red, green and blue (RGB) emitters are arranged closely to form approximately a single emitter position. As an illustration, the emitter position 1301 is constituted of red emitter 1304, green emitter 1305 and blue emitter 1306. Additional RGB wavelengths form the other separated emitters 1302 and 1303 to ultimately create a three-exit pupil composite eyebox. All emitters in this example should be separated in wavelength from each other to allow for independent control and low crosstalk in the multiplexed holographic transflector. FIG. 13B shows how the slightly shifted RGB emitters for a single eyebox create slightly angle shifted scans at the eye, producing the image 1307 on the retina. To combine these images for the human viewer, image preprocessing can be used to align the images into a single apparent color image with an expanded composite eyebox 1305. In another embodiment red, green and blue light sources are combined using a dichroic beam combiner. FIG. 14 shows the optical apparatus to non-coaxially combine the multiple wavelength sources from three panels 1401, 1402 and 1403 using a prism dichroic beam combiner 1408. This optical arrangement is useful in particular for combining red, green and blue (RGB) panels. In this example embodiment, sources 1101, 1102, 1404, 1405, 1406 and 1407 are shown in a configuration with two sources for each panel at different center wavelengths. The sources are accurately placed and arranged on a single effective plane such that their spatial positions are transformed into angular separations by a telecentric lens 1103 which has its exit pupil collocated with the scanning micromirror 1104. After reflection from the scanning mirror 1104, light 1409 travels to a projection lens (not shown) to focus the light for presentation to the hologram transflector such that the light is collimated or nearly collimated at the eye. The angles between the separate sources are designed such that the pre-processed image shifts necessary to align the different images from each exit pupils at the eye is minimized.

Figure 15:
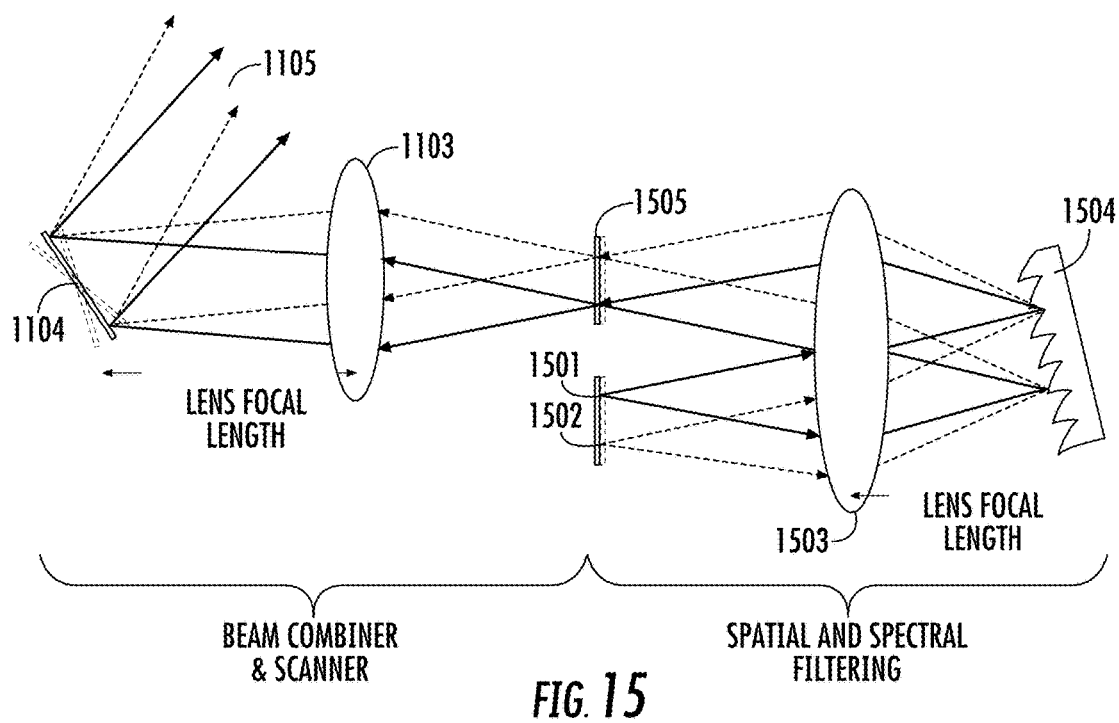
FIG. 15 is an optical schematic of the scanning projection module with non-coaxially combined beams with additional spatial and spectral filtering in reflection according to an embodiment of this invention.
Figure 16:
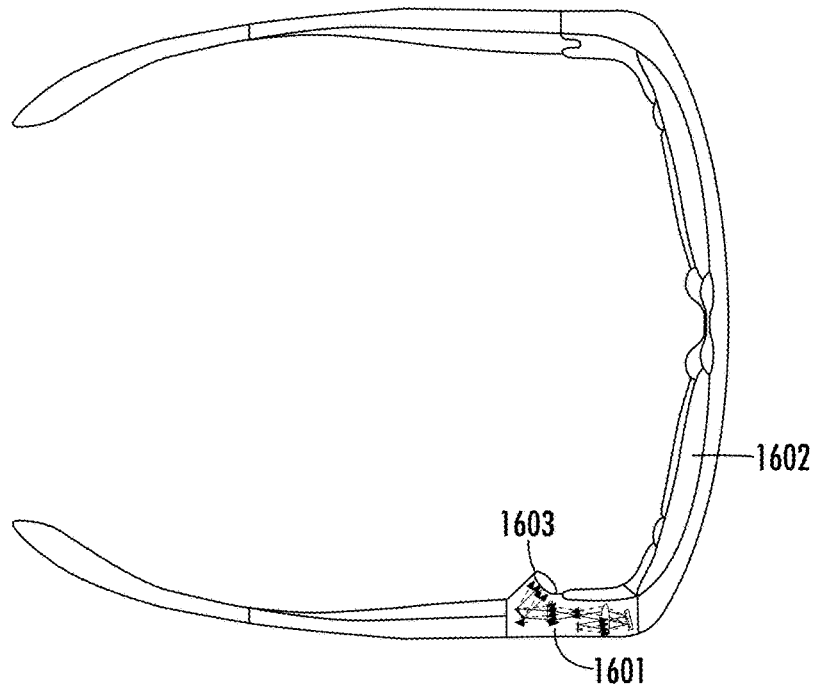
FIG. 16 is a drawing of a monocular scanned beam head worn display using the projection module of FIG. 15 according to an embodiment of this invention.
Figure 17:
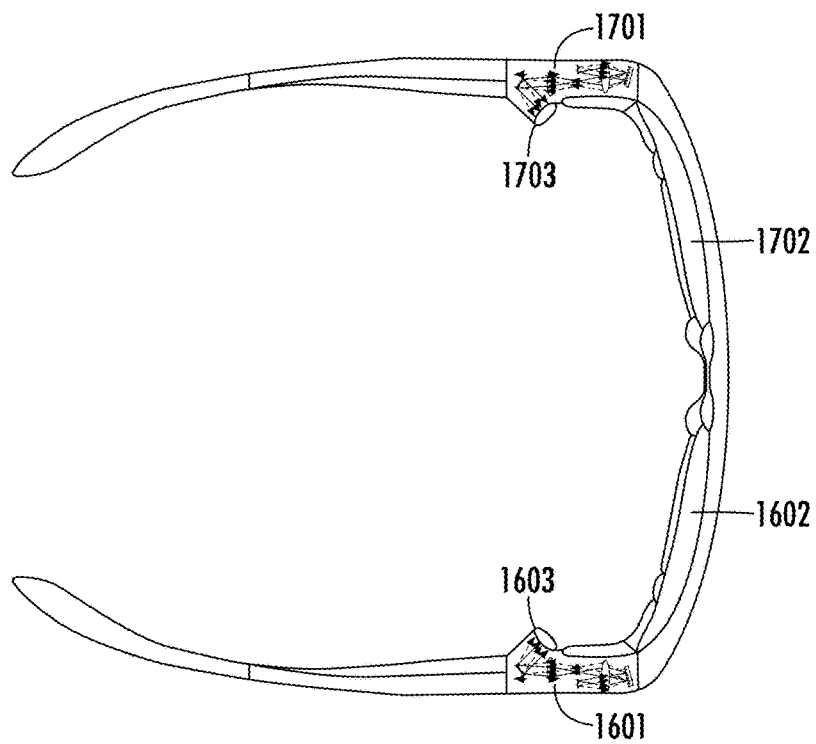
FIG. 17 is a drawing of a binocular scanned beam head worn display using the projection module of FIG. 15 according to an embodiment of this invention.
Figure 18:
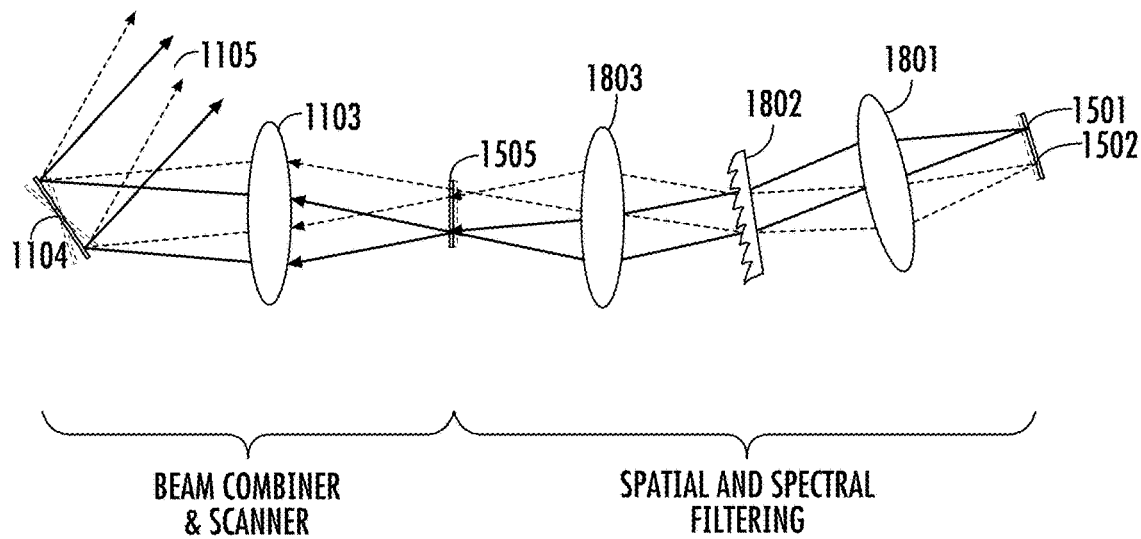
FIG. 18 is an optical schematic of the scanning projection module with non-coaxially combined beams with additional spatial and spectral filtering in trans-mission according to an embodiment of this invention.
Figure 19:
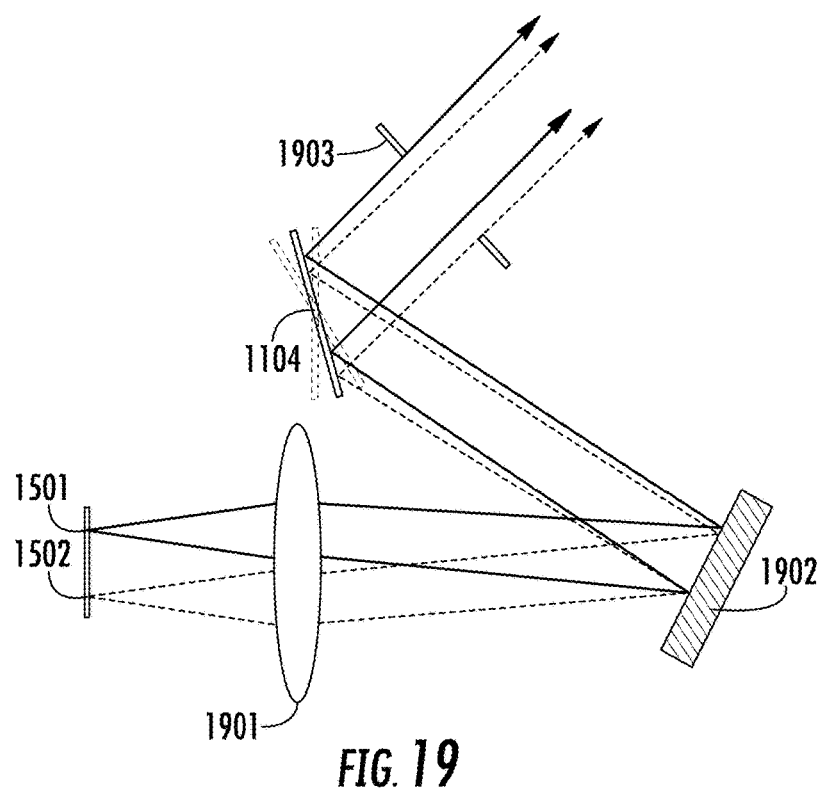
FIG. 19 is an optical schematic of a scanning projection module with non-coaxially combined beams using a holographic filtering element according to an embodiment of this invention.

In yet another embodiment, light sources with relatively large spectral bandwidths are used; for example LEDs. To prevent crosstalk from the holographic transflector, spectral filtering may be required to reduce the bandwidth of each emitter. In at least one embodiment this can be achieved using a spectral filtering section such as but not limited to the implementation shown in FIG. 15. In this arrangement, the source array constituted of sources 1501 and 1502 would be as described previously in FIG. 12 or FIG. 13, however this source would be first reimaged onto a spatial filter mask 1505 after double passing through a lens and reflecting from a diffraction grating 1504. By jointly optimizing the source arrangement, lens, diffraction grating and mask, light can be efficiently produced at the mask in the spatial arrangement needed for the non-coaxial combiner shown on the left hand side of FIG. 15. Further, in at least one embodiment, the light sources can be made oversized—larger than the apertures in the filter mask. The purpose of this would be to reduce the alignment sensitivity of the optical assembly in exchange for reduced power efficiency. FIG. 15 shows an optical apparatus to non-coaxial beam combine and project which includes the angular combiner of FIG. 11 along with a spectral and spatial bandwidth filter section. Alternatively, the spectral and spatial filter sections could be applied to the RGB combiner of FIG. 14. The spatial and spectral bandwidth sections prevent crosstalk when more broadband sources such as LEDs and resonant cavity LEDs are used. Light sources separated in wavelength and position 1501 and 1502 project to a lens 1503 and then to a diffraction grating 1504 to disperse light from each emitter in angle and then filter both spatially and spectrally the conjugate image using an aperture mask 1505. Following the aperture mask, the angular combiner of FIG. 11 combines the beams as described previously. The light source implementation shown in FIG. 15 can be compactly implemented into eyewear by mounting the assembly within the arm of the eyewear. FIG. 16 shows a conceptual monocular HMD arrangement using the angular source combiner and spatial and spectral filters 1601 of FIG. 15. This arrangement also includes the holographic transflector 1602 and the projection lens 1603. In another embodiment, FIG. 17 shows a conceptual binocular HMD arrangement using two of the angular source combiners and spatial spectral filters 1601 and 1701 of FIG. 15. This arrangement also includes two holographic transflectors 1602 and 1702 on each spectacle lens and two projection lenses 1603 and 1703. In another embodiment, the spectral and spatial filtering implementation can be done in a transmissive rather than reflective arrangement, such as but not limited to the implementation shown in FIG. 18. Compared to FIG. 15, the optical configuration of FIG. 18 is not a folded double-pass with a reflective grating, but instead an in-line transmission arrangement. Light sources 1501 and 1502 separated in wavelength and position project to a lens 1801 and then to a transmission diffraction grating 1802 to disperse light from each emitter in angle and then filter both spatially and spectrally when focused by a lens 1803 to the conjugate image on the aperture mask 1505. Following the aperture mask, the angular combiner of FIG. 11 combines the beams as described previously. Further, in yet another embodiment of the light source emitter with spectral filtering, a multiplexed reflection holographic element can be used to perform spectral filtering on the light emitted from broadband sources before reflecting from a scanning mirror, such as but not limited to the implementation shown in FIG. 19. In FIG. 19 light sources separated in wavelength and position 1501 and 1502 project to a lens 1901 and then to the multiplexed reflective volume hologram 1902. Diffracted beams from the HOE 1902 are filtered spectrally by the recorded volume hologram before being transported to the scanning mirror 1104 and then to an aperture filter 1903. The direction of the light can also be adjusted by grating slant.

In at least one embodiment, the present invention of multiple exit pupils created with a holographic element relates to a head worn display created using a microdisplay panel rather than a scanning mirror projection system. The panel microdisplay is illuminated by a source such as an LED or a laser light source and projected toward the eye forming a conjugate image of the microdisplay on the retina. This holographic transflector element performs two primary functions. It allows ambient light from the environment to pass through providing normal vision to the user. It also redirects scanned light from the projector to the eye to provide an image on the retina. In the present invention, the introduction of multiple small beams forming a composite exit pupil reduces the etendue of the light beams compared to prior art (see FIG. 2, U.S. Pat. No. 4,940,204). This has two significant effects:

1) it reduces the size of the projection optics, making the HWD smaller and lighter. This can be seen by examining FIG. 2, and considering the effect of a smaller numerical aperture for the light from the projector to the hologram;
2) it reduces the optical aberrations of the system as reducing numerical aperture improves optical performance.

Figure 20:
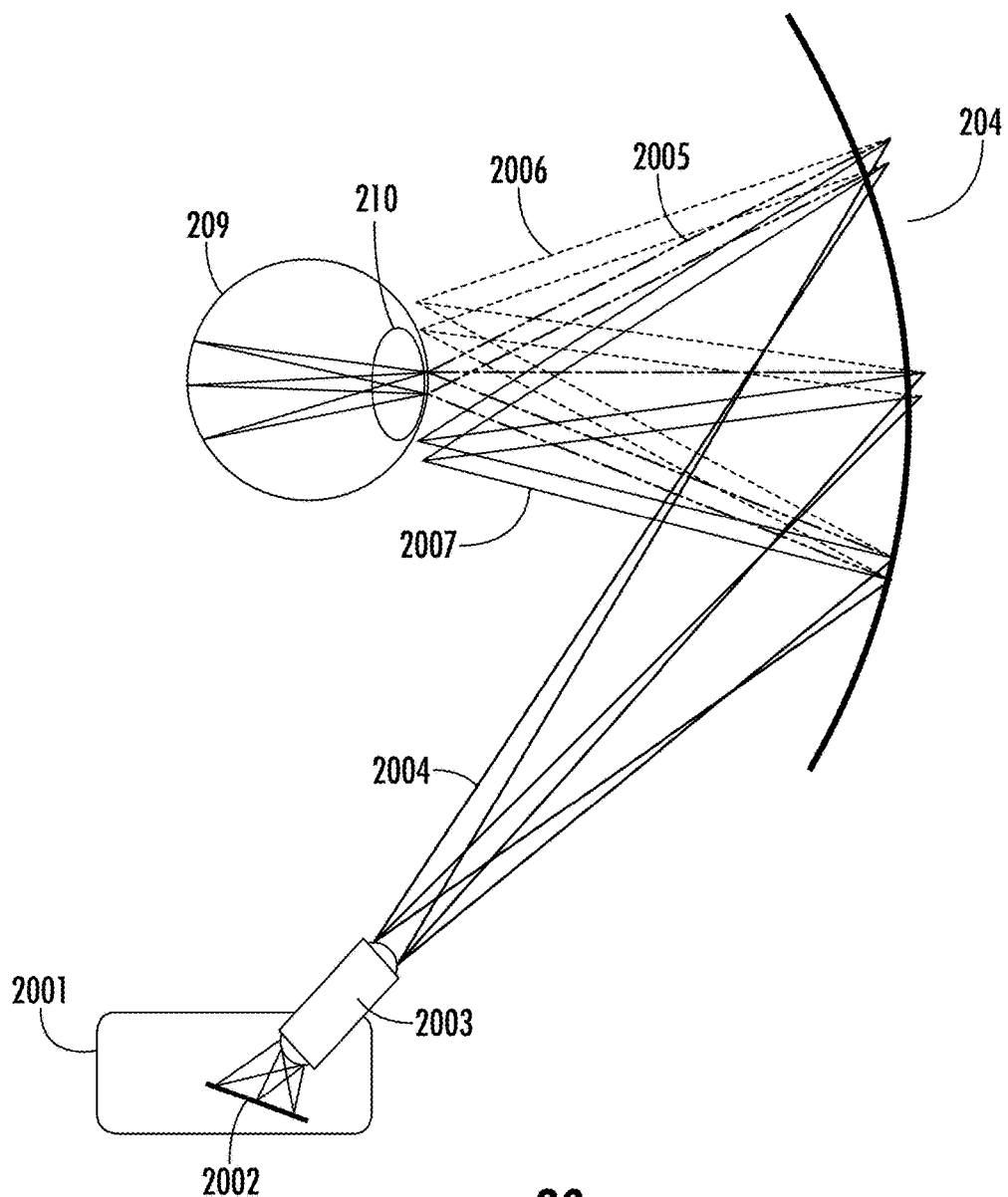
FIG. 20 is an optical schematic of head worn display based on projection of a micropanel display, aligned to the eye with one of three exit pupils formed by wave-length multiplexing according to an embodiment of this invention.

In published literature related to U.S. Pat. No. 4,940,204 it was described that despite significant efforts to optimize the hologram recording and projection optics, the system did not perform to a high standard due to aberrations which reduced image quality. By dramatically reducing the beam size (for example, by 1 Ox) these aberrations can be better controlled for a high quality image. This requires that the eyebox be expanded, which is accomplished by wavelength or shift multiplexing to create a multiple-beam exit pupil at the eye location as described above. In at least one embodiment, a field sequential color LCOS microdisplay is used to project the different wavelengths of light onto the hologram to create multiple exit pupils. Sources of different colors are combined and presented to the microdisplay. The microdisplay cycles through the colors sequentially such that the time to project all the wavelengths constitutes one video frame. This requires that the microdisplay refresh at a rate at least equal to (the number of wave-lengths)*(the desired video rate). The microdisplay then displays a shifted and distortion corrected image for each wavelength such that the images are combined to form a single image at the eye due to persistence of vision (see FIG. 4). Further, in at least one embodiment, a simple eye tracking system is used to preferentially activate the exit pupil best aligned to the eye. This has the advantage of reducing the required refresh rate of the microdisplay and power consumption of the light sources when using field sequential color since only the subset of wavelengths for a single exit pupil needs to be displayed at any moment in time. In at least one embodiment, the projection optics used to transfer light from the microdisplay to the hologram use tilted, shifted, aspheric and non-rotationally symmetric optical elements to pre-compensate for aberrations formed by the off-axis projection and the hologram's reflection. Similarly, the hologram recording setup (shown in a simplified configuration in FIG. 8) will utilize tilted, shifted, aspheric and non-rotationally symmetric optical elements to optimize the hologram for readout in the HWD with low optical aberrations. The joint optimization of the projection optics and hologram recording reduces the aberrations of the arrangement to form low aberration and high quality images on the retina. In yet another embodiment, a light-emitting panel such as an OLED is used. Here the pixel structure—whether stacked or side-by-side for different emission colors—creates the multiple wavelengths necessary to create the multiple exit pupils at the eye. Each set of similar wavelength pixels is individually controlled to produce a properly shifted and distortion pre-compensated image for projection onto the hologram and subsequently to the user's eye forming a single apparent monochrome or color image using the different wavelengths. FIG. 20 shows the multiple exit pupil arrangement with a panel microdisplay rather than scanning projector. Light from a microdisplay 2002 within a projection module 2001 is projected through projection optics 2003 onto a multiplexed holographic screen 204. The holographic screen 204 is multiplexed in wavelength to separate each wavelength to create multiple exit pupils as also described in FIG. 3 thru FIG. 7. A single image is created at the eye by preprocessing the images as shown in FIG. 4. The projection optics 2003 consist of an arrangement of optical elements necessary to present light to the holographic element 204 such that the holographic element reflects nearly collimated light toward the eye with low aberrations. These optical elements of the projection lens consist of, but are not limited to lenses, mirrors, freeform elements, shifted and tilted elements, aspheric lenses and mirrors, non-axisymmetric lenses and mirrors and prisms. Three light field positions 2004 are shown projected from the projector. After reflection from the holographic reflector 204, three angularly separated beams 2005, 2006 and 2007 form spatially separated exit pupils at the eye 209.

In another embodiment of the multiple exit pupil head worn display, the present invention relates to system and method for placing two or more exit pupils on the eye with control over their locations such that 1) at least one exit pupil provides an image overlaid with on-axis see-through vision sub-display;
2) at least one exit pupil provides a independent and separate image in a "glance-at" sub-display substantially off-axis from normal vision. In at least one embodiment, the HOE is divided into two or more areas representing separated fields of view, with at least one area redirecting light in the exit pupil providing the on-axis see-through sub-display, and at least another area redirecting light in the exit pupil providing the glance-at off-axis sub-display.

Figure 21E:
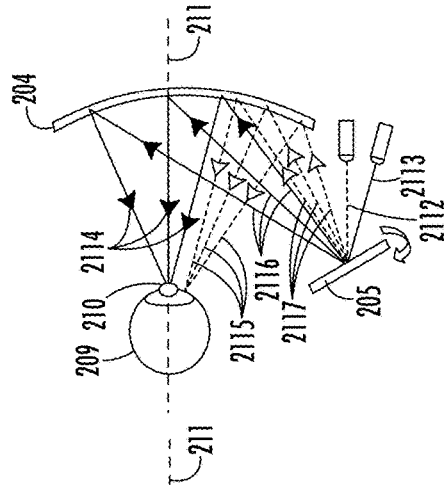
FIG. 21E is an optical schematic of the scanned retinal display with the eye aligned to one of two separated exit pupils with separated fields of view created with two angularly separated sources according to an embodiment of this invention.
Figure 21F:
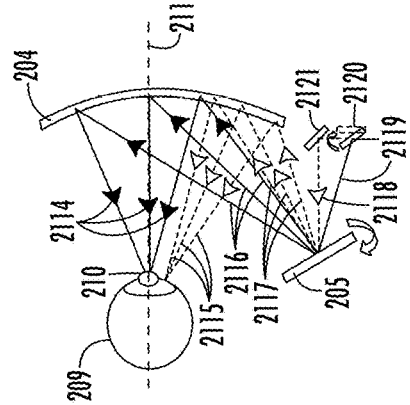
FIG. 21F is an optical schematic of the scanned retinal display with the eye aligned to one of two separated exit pupils with separated fields of view created with a single source that is split and separated in angle according to an embodiment of this invention.
Figure 21C:
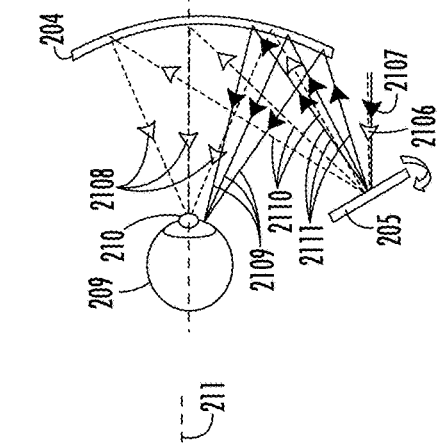
FIG. 21C is an optical schematic of the scanned retinal display with the eye aligned to one of two separated exit pupils with slightly overlapping fields of view created with two wavelengths according to an embodiment of this invention.
Figure 21D:
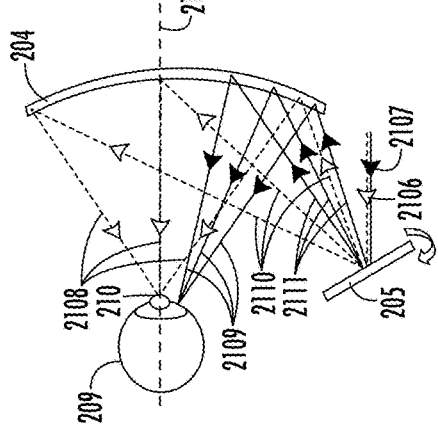
FIG. 21D is an optical schematic of the scanned retinal display with the eye aligned to one of two separated exit pupils with significantly overlapping fields of view created with two wavelengths according to an embodiment of this invention.
Figure 21A:
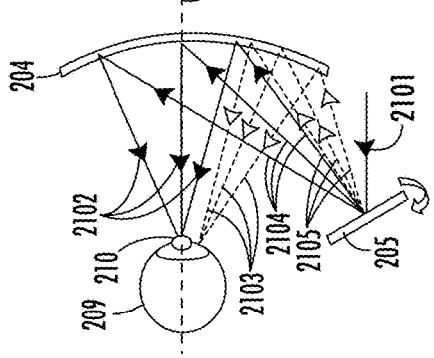
FIG. 21A is an optical schematic of the scanned retinal display with the eye aligned to one of two separated exit pupils with separated field of view created with a single wavelength according to an embodiment of this invention.
Figure 21B:
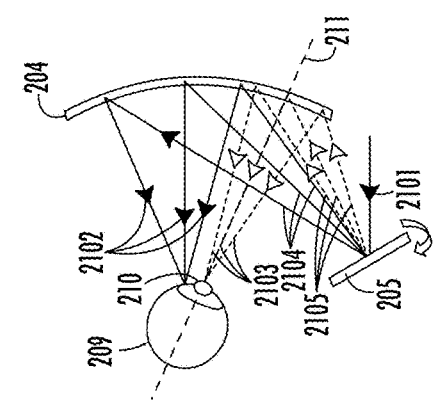
FIG. 21B is an optical schematic of the scanned retinal display with the eye aligned to the second of two separated exit pupils with separated fields of view created with a single wavelength according to an embodiment of this invention.

FIG. 21A shows an optical schematic of the scanned retinal display with the eye aligned to one of two separated exit pupils with separated field of view created with a single wavelength beam 2101. The single wavelength beam is incident on the scanning mirror 205 which divides the overall field of view into the on-axis see-through display light 2104 and the glance-at off-axis light 2105. Both sets of beams reflect from the holographic reflector 204 forming converging light bundles 2102 and 2103 which form the two exit pupils at the eye 209. In this figure the eye line of sight 211 is aligned to the on-axis see-through light 2102. FIG. 21B shows the same system as FIG. 21A but with the eye line of sight 211 aligned to the glance-at off-axis light 2103. In another embodiment, the usable field of view for both the on-axis see-through sub-display and the off-axis glance-at sub-displays overlap partly. FIG. 21C shows an optical schematic of the scanned retinal display with the eye line of sight aligned to one light bundle 2108 with partly overlapping field of view from a second light bundle 2109 created with two wavelength beams 2106 and 2107. Recording and reading the HOE by different wavelengths or sets of wavelengths makes the differentiation between the on-axis see-through sub-display and the off-axis glance-at sub-display. In yet another embodiment shown in FIG. 21D, both the on-axis see-through sub-display field of view and the off-axis glance-at sub-display field of view can be over-lapped allowing the user to view alerts in the off-axis glance-at sub display while looking straight ahead. In at least one embodiment, the MEMS scan mirror projects light over a broad enough angular range to display information for both the on-axis see-through sub-display and the off-axis glance-at sub-display, as shown in FIG. 21A—FIG. 21D. Both the position at which the light impinges on the HOE and the light wavelength discriminate in which exit pupil the light is redirected, thus for which sub-display the light is sent to. In at least one embodiment, a plurality of light sources—one for each sub-display—are placed at different positions. FIG. 21E shows an optical schematic of the scanned retinal display with the eye aligned to one light bundle 2114 with a separate field of view from a second light bundle 2115 created with two light sources separated in position and angle 2112 and 2113. Light generated from one particular position impinges on the HOE so as to be used for the on-axis see-through sub-display, while light generated at another position impinges on the HOE so as to be used for the off-axis glance-at sub-display. In another embodiment shown in FIG. 21F, a flip mirror 2120 modifies the incident angle of the light impinging on the scanning mirror 205, thus modifying at which position light beams impinge on the HOE. Light can then be sent to the area providing an off-axis glance-at sub-display for a given position of the flip mirror, or be sent to the area providing an on-axis see-through sub-display.

In another embodiment of the invention, multiple scanning mirrors create multiple exit pupils at the location of the eye by reflecting from a holographic optical element. In at least one embodiment the hologram is angle multiplexed for the multiple exit pupils. FIG. 22A is a top view optical schematic of the scanned retinal display with two scanning mirrors (only one visible) 2201, where light from two different angles reflects from the hologram 204 back to the eye 209 to create two separated exit pupils at the eye. FIG. 22B shows the side view of the same system of FIG. 22A where the two scanning mirrors 2201 and 2202 create two separated beams 2203 and 2204 which in turn create two independent exit pupils at or near the eye's location. FIG. 23 shows a setup to record the angularly multiplexed holograms for the multiple exit pupil head worn display of FIG. 22A. This figure is similar in many respects to the wavelength-multiplexed embodiment of FIG. 8. Each laser used is split into two beams, which would interfere into the holographic film. On the reference arm, each light source send light to the hologram from distinct locations, resulting in different incidence angle at every position of the holographic film. For a selective enough holographic material and distant enough incidence angles, each beam incident on a position of a then recorded HOE is stirred into its corresponding eyebox. In FIG. 23 three lasers of the same center wavelength 2301 are used to produce a holographic transflector with three exit pupils collocated with the eye in the head worn display. After passing through half wave plates 2302, the beams from the lasers are split with polarizing beam splitters 807, 808 and 809 and coupled by focusing optics 2303 into fibers 2304. The object beams 2306 pass through lenses 827 and 825, are reflected by a mirror 828, and pass through a polarizer 826 before passing through the holographic material 824 and focusing at the exit pupil locations 829. The reference beams 2305 pass through a polarizer 2307 prior the holographic transflector 824. In the reference beams 2305, the lasers are presented to the HOE using the angles of incidence representative of the multiple scanning mirrors. In the object beams 2306, the lasers are spatially presented to the HOE to create the multiple exit pupils at the eye location. Although three laser sources and multiplexed angles are shown, the setup can be scaled for additional multiplexed holograms.

Figure 24B:
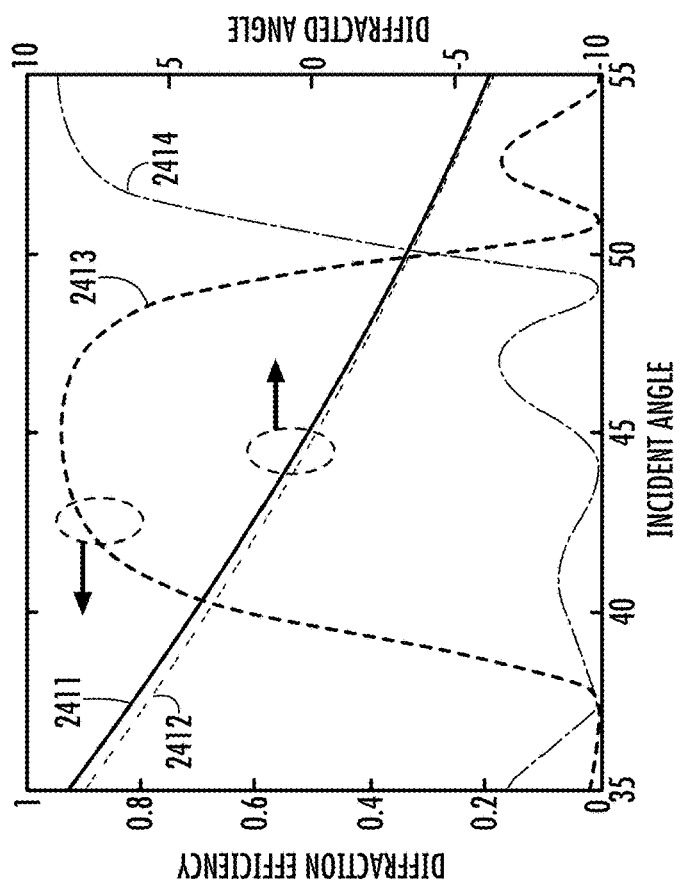
FIG. 24B is an illustration of the diffraction efficiency and diffraction angle for two angle-multiplexed holograms for a non-pupil forming head worn display.
Figure 24A:
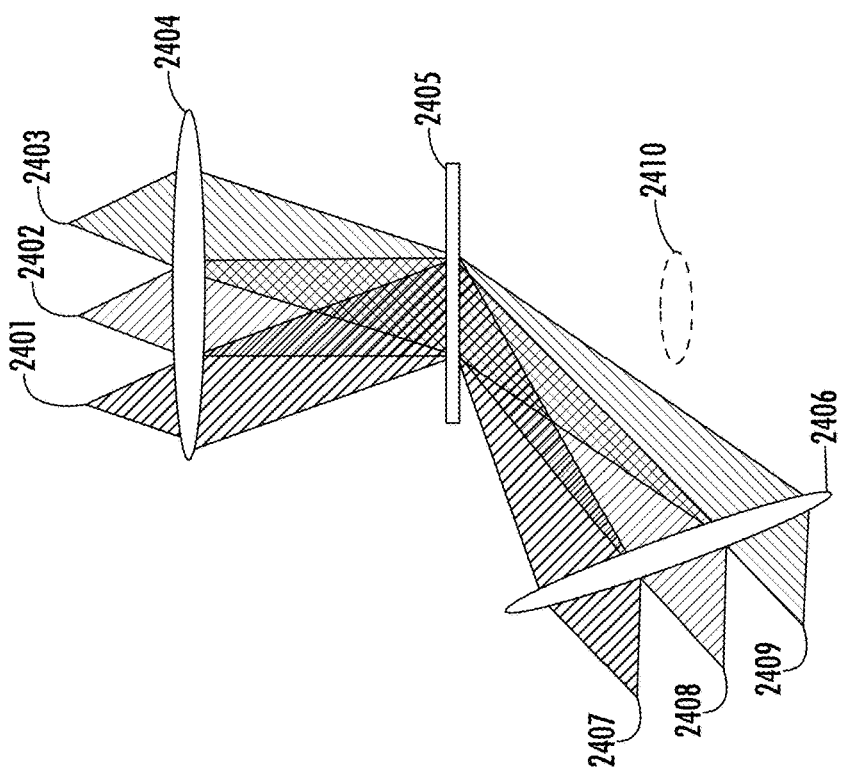
FIG. 24A is an optical schematic of the simultaneous hologram writing method to create three distinct fields of view for a non-pupil forming head worn display using angular multiplexing.
Figure 25:
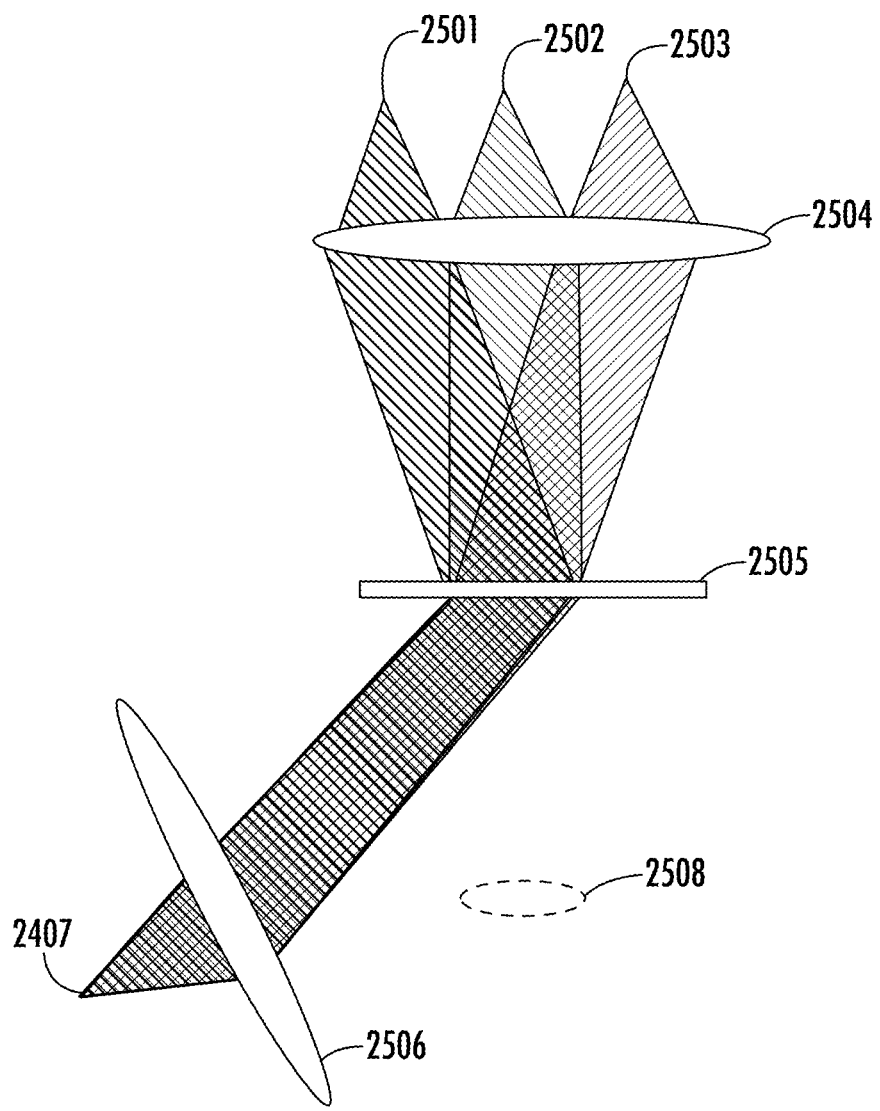
FIG. 25 is an optical schematic of the simultaneous hologram writing method to create three distinct fields of view for a non-pupil forming head worn display using wavelength multiplexing.

In another embodiment of the invention, two collimated or nearly collimated beams incident each side of the HOE interfere to produce a reflective hologram for a non-pupil forming head worn display. The head worn display is referred to as non-pupil forming since no intermediate image is formed in the optical system. A consequence of this type of arrangement is that field of view is limited, and more difficult to increase than the eyebox. With a non-pupil forming system the field of view can be increased using two or more sets of collimated or nearly collimated beams incident on opposite side of the holographic film interfere on the holographic film to produce a reflective hologram as shown in FIG. 24A. Each set is constituted of two beams previously split from the same coherent light source. In at least one embodiment, the HOE is multiplexed angularly. FIG. 24A shows three sets of beams. The reference beams 2407, 2408 and 2409 are collimated by a lens 2406 and incident on the holographic material 2405. The object beams 2401, 2402 and 2403 are collimated by a lens 2404 and incident on the opposite side of the holographic material 2405. The then recorded holographic transflector will produce exit pupils whose location 2410 will be below the holographic material. In at least one embodiment, it is possible to greatly reduce the crosstalk by matching read-out and diffracted angles of the different multiplexed HOE. In FIG. 24B, the diffraction efficiency 2413 and 2414 in function of wavelength are shown for two different holographic transflectors as calculated by an analytic mathematical model. The diffraction angles 2411 and 2412 of the two holograms as a function of incidence angle are also shown. Because the holograms are closely matched in their incidence angle to diffracted angle, they can be combined for a contiguous overall field of view. The diffracted angle is of 3.304° for both the holographic transflector recorded with a reference beam angle of 45° and the holographic transflector recorded with a reference beam angle of 55°. In another embodiment, the non-pupil forming HOE is multiplexed spectrally rather than in angle. FIG. 25 shows the reflection hologram writing arrangement with three multiplexed wavelengths. The object beam is made up of three spatially separated sources 2501, 2502 and 2503 of three different wavelength which are collimated by a lens 2504 and brought together on the holographic material 2505. The reference beam contains the three wavelengths beam combined into a single recording beam 2407, which is collimated by a lens 2506, and then incident on the holographic material 2505. The then recorded holographic transflector will produce exit pupils whose location 2508 will be below the holographic material.

Figure 26:
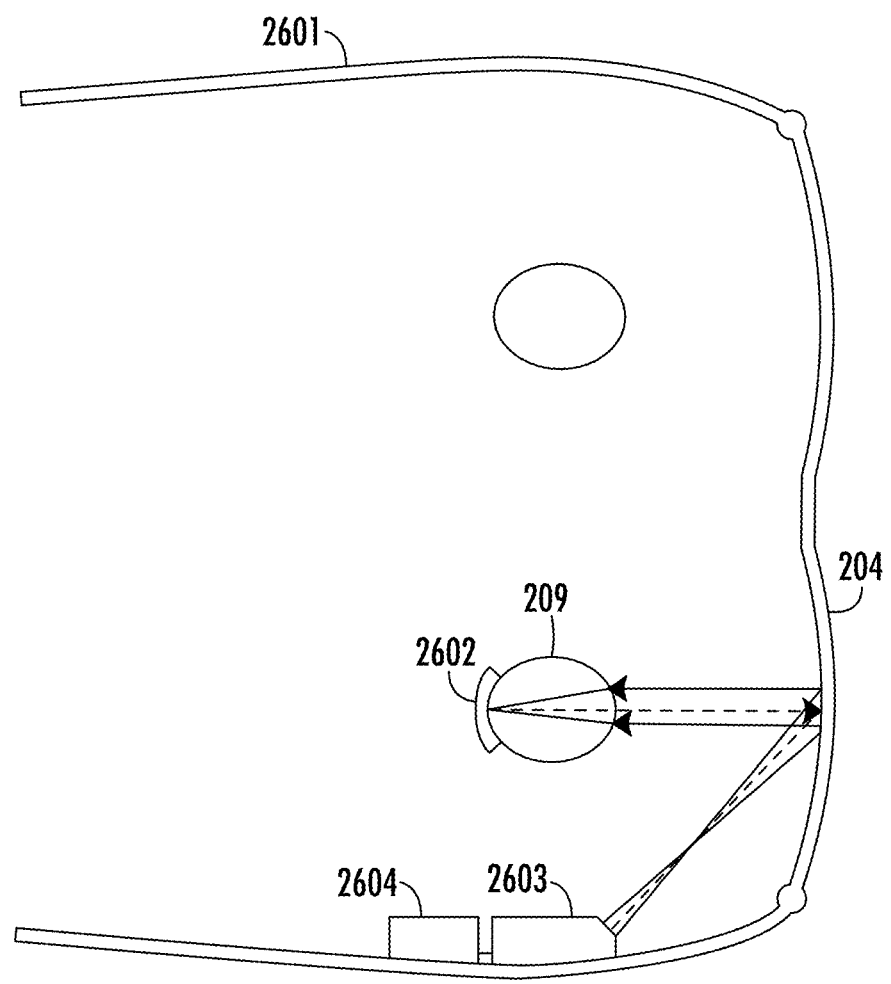
FIG. 26 is a drawing of a scanning projection monocular head worn display according to an embodiment of this invention.

FIG. 26 shows a drawing of a scanning projection monocular head worn display on an eyewear frame 2601. Light emitted from a light source 2604 is projected by scanning mirror and focusing optics 2603 before being reflected by a transflector element 204 to the eye 209. Display light is focused on the retina 2602.

Figure 27:
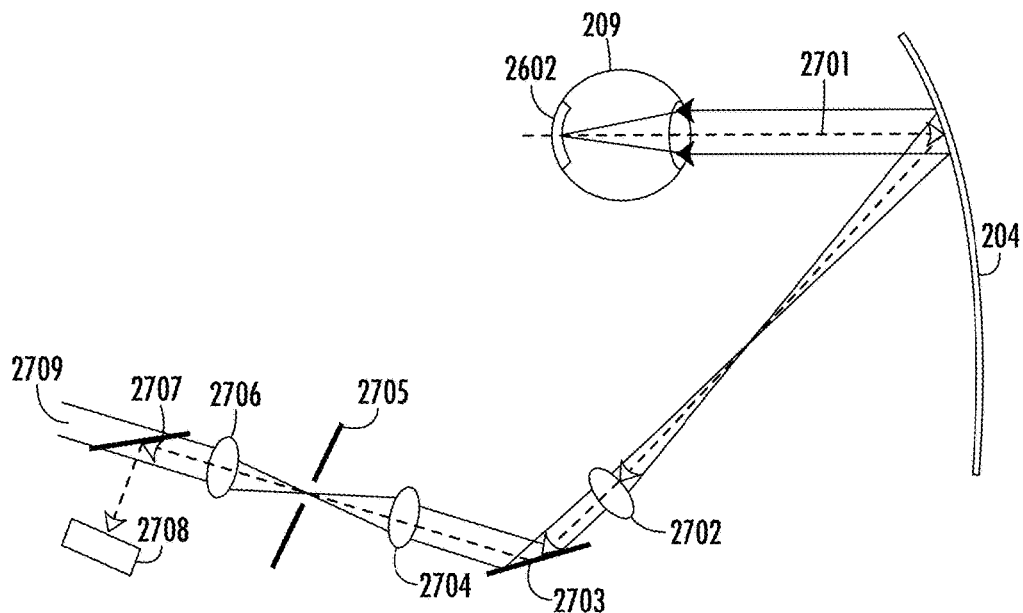
FIG. 27 is an optical schematic of a scanning projection head worn display including confocal imaging of the retina according to an embodiment of this invention.
Figure 28:
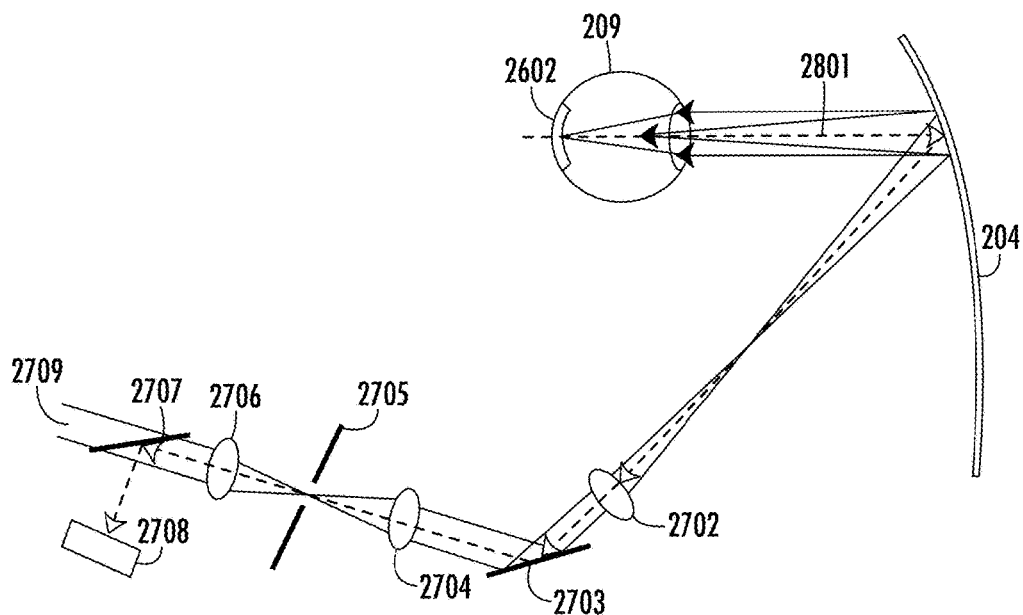
FIG. 28 is an optical schematic of a scanning projection head worn display including confocal imaging of arbitrary eye surfaces according to an embodiment of this invention.
Figure 29:
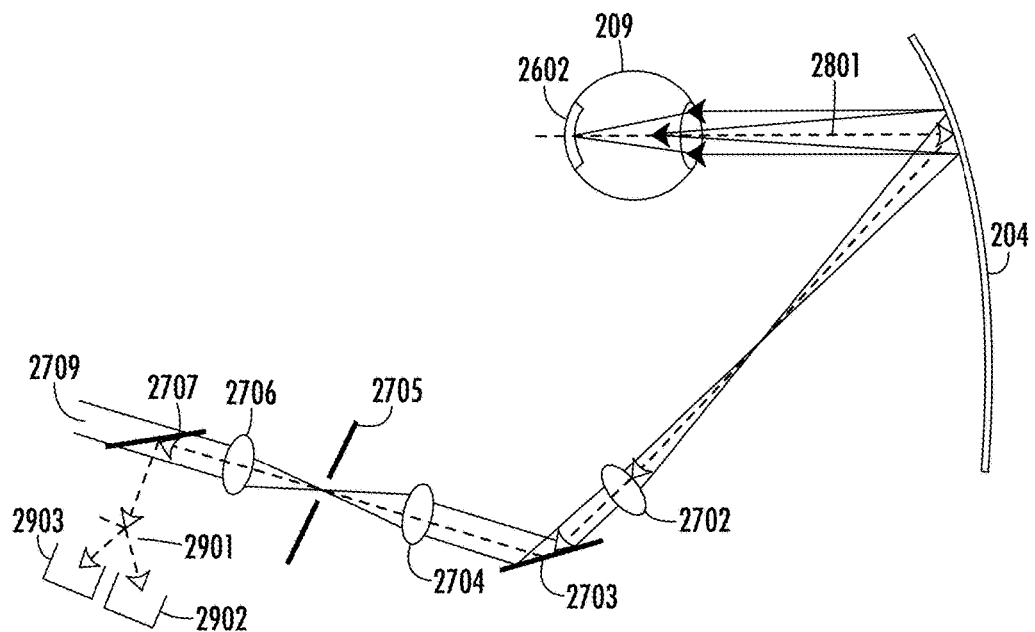
FIG. 29 is an optical schematic of a scanning projection head worn display including confocal imaging of the eye using an additional wavelength separated with a diffraction grating according to an embodiment of this invention.
Figure 30:
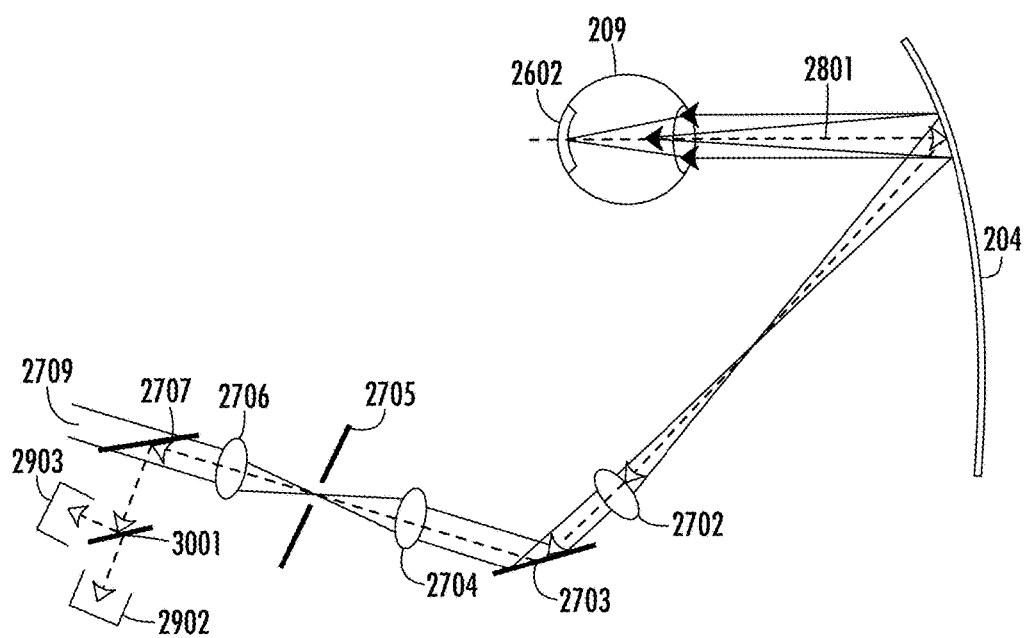
FIG. 30 is an optical schematic of a scanning projection head worn display including confocal imaging of the eye using an additional wavelength separated with a dichroic beam splitter according to an embodiment of this invention.

In another embodiment of the invention, confocal images of the eye are measured using light reflected from the eye and captured in a detector within the scanning projection system. FIG. 27 describes an imaging system based on a con-focal microscope arrangement. Collimated light from the light source 2709, which contains one or more light sources, is focused by a first lens 2706 on a pinhole 2705. Light from the pinhole is collimated by a lens 2704 and scanned by a scanning mirror 2703 in two dimensions. The light is directed and passe through a lens 2702 to an appropriate holographic transflector 204, which can be a volume holographic element, a diffractive optical element (relief) or a curved reflective element with frequency selective response. For a given angle of the scan, the light is focused on one point on the retina 2602. A part of this light is reflected back, either at the same wavelength (Rayleigh scattering), by fluorescence, Raman or by non-linear phenomenon (frequency shifted from the incident light). The beam propagates back 2701 and is reflected by the holographic transflector. In case of frequency shifted light, the holographic transflector has an appropriate reflection at the shifted frequency. Since the image of the pinhole is the point on the retina where the light is focused, the pinhole will block light that is not coming from this focus. This is the basic principle of confocal microscopy. It allows rejection of stray light and scattering light from other parts of space. After the pinhole, the reflected light is directed to a detector 2708 after reflection by a beam-splitter 2707. An image of the retina is thus formed point by point by scanning the incident light beam with the scanning element. FIG. 28 shows a variation of FIG. 27. The holographic transflector reflects the incident beam of a particular wavelength and focuses it 2801 in a different part of the eyeball (different than the retina). This way, other structures of the eye can be imaged. For example, light beam 2801 can be focused on the crystalline lens of the eye. Some studies have shown that the level of auto fluorescence (blue excitation) of the crystalline lens is an indicator of diabetes. The wearable method allows to continuously monitor the auto-fluorescence of the crystalline lens non-invasively and thus provide valuable information to physicians. FIG. 29 shows yet another variation. By using an additional wavelength in the infrared, the visible head worn display is not perturbed (the transflective screen does not modify visible light in this case). Images of the retina 2602 are obtained by one dedicated detector 2903 and images of other parts (e.g. lens) are obtained with another detector 2902 since the information is encoded spectrally in different color and then detected separately. A diffraction type beam splitter is used to separate the infrared and visible light 2901. FIG. 30 is another implementation where the beam are separated, at the detector, by a beam splitting filter 3001 which can be, but not restricted to, of interference type, dichroic, holographic. In another embodiment of the confocal imaging method of the invention, a fiber optic is used in place of the pinhole aperture as shown in FIG. 30. With an optical fiber 4301 the light source is displaced to a different location from the scanning mirror, allowing for more flexibility in the eyewear design. The fiber itself is one from the following list: a single mode fiber, a multi-mode fiber or a dual cladding fiber, which includes both a single mode core and a larger multimode core. With a dual cladding fiber the single mode core is used to project light into the HWD with high resolution, while the multimode core is used to collect the confocal return signal. This allows a larger aperture to be used for the confocal return signal for increased signal to noise without sacrificing display resolution. The above embodiments are used to image the eye. Because the retina can be imaged, the veins can be identified and thus parameters such as the flow of blood cells, heart rate and arterial pressure (systolic, mean and diastolic) can be measured using a number of ways. Heart rate can be measured, but not limited to, by using the small reflectivity changes caused by the varying blood volume occurring while the heart is pumping blood. Because the imaging system is confocal, a precise region (such as a vein) can be isolated from the other part of the eye to extract the signal with a high signal to noise ratio. Hemoglobin concentration oscillates with time as a result of the arterial pulsation associated with the systolic-diastolic pressure variation. Thus a spectroscopic optical measurement of the backscattered light from a vein is another method to obtain arterial pulsation. The spectroscopic measurement can be obtained by using two or more wavelength (such as for example two available in the red of the HWD invention.

Figure 31:
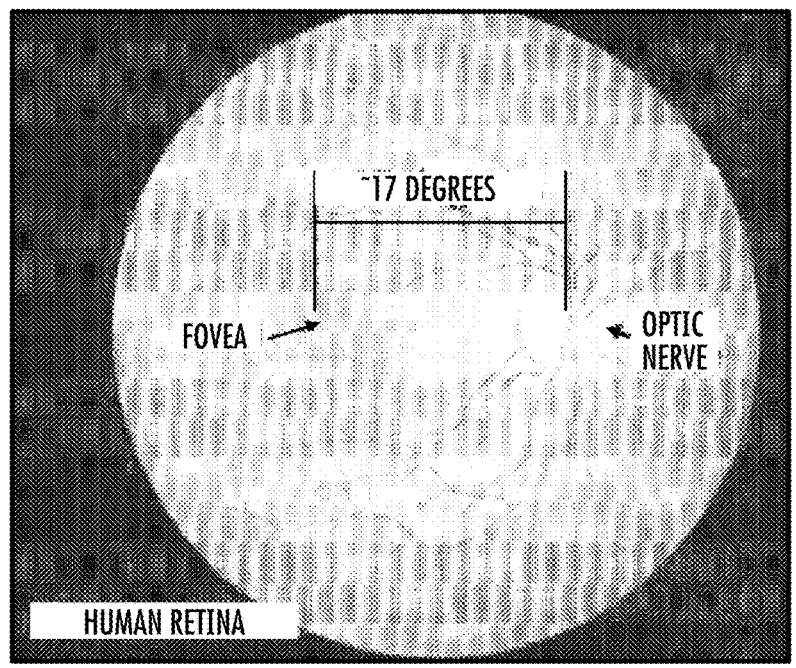
FIG. 31 is an image of a retina from an ophthalmoscope.
Figure 32:
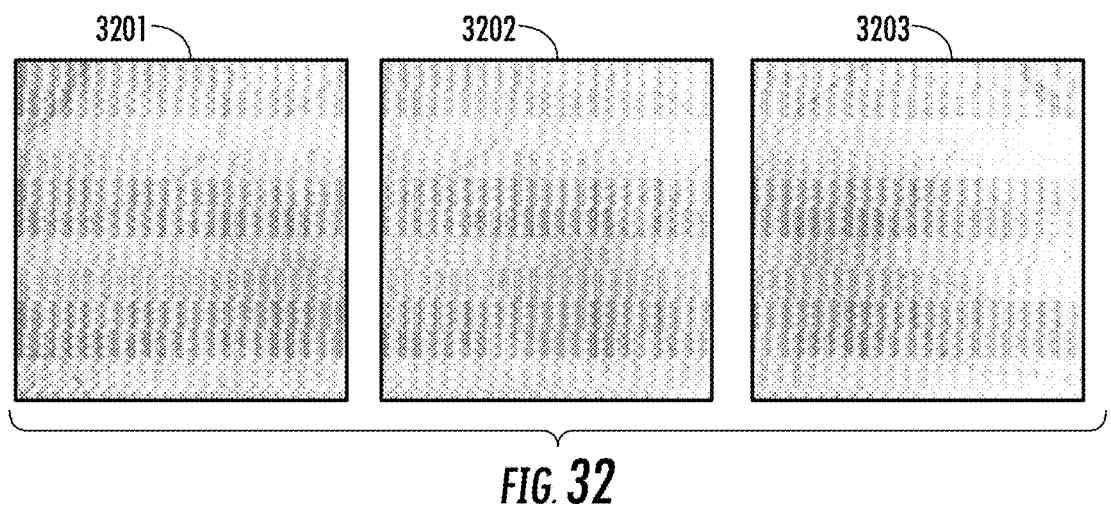
FIG. 32 is a set of three images of a single retina for three different gaze directions.
Figure 33:
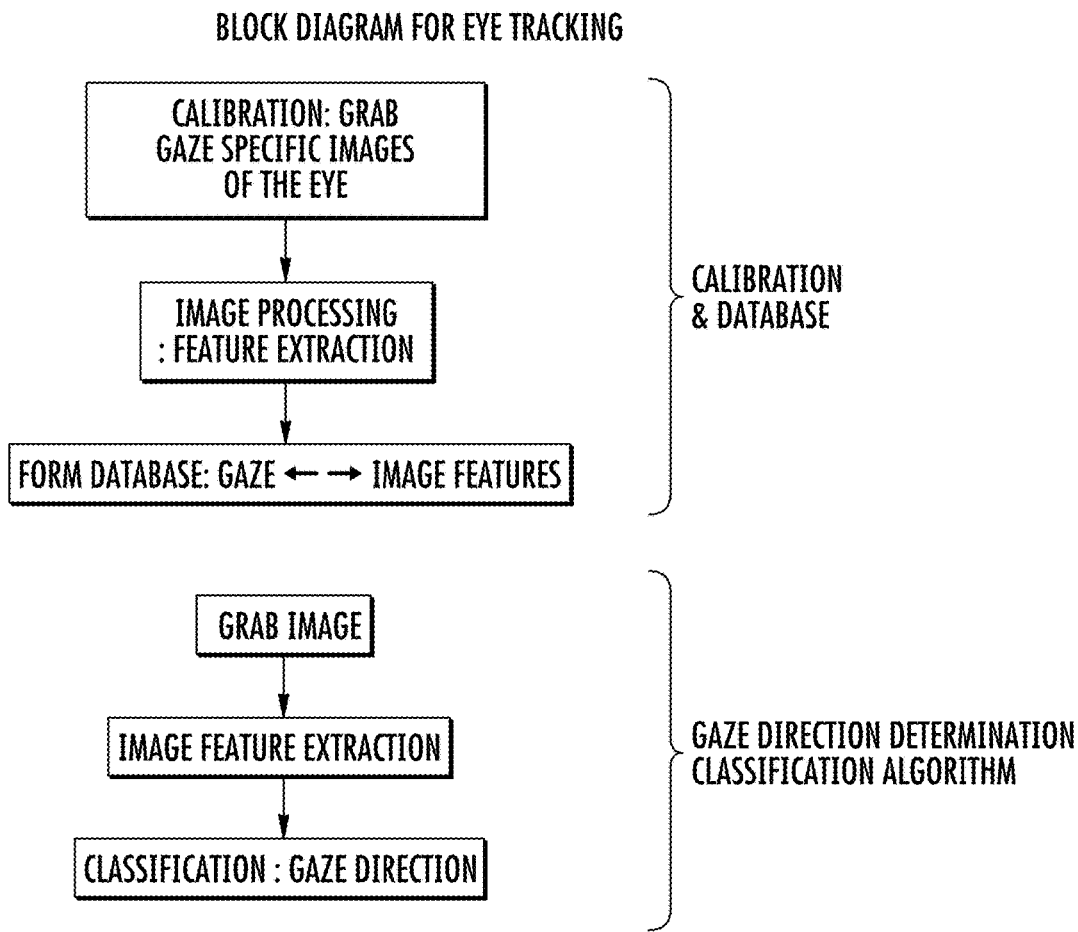
FIG. 33 is a block diagram of eye tracking method according to an embodiment of this invention.

In another embodiment of the invention, scanned confocal images of the eye are used for eye tracking. FIG. 31 is an image of the retina taken with a standard ophthalmoscope (microscope adapted for the eye). The veins can be clearly seen. FIG. 32 illustrates the different parts of the retina that would be seen by an ophthalmoscope such as described in FIG. 27 to FIG. 30. The different images 3201, 3202 and 3203 correspond to different gaze directions. One can see that the images have features that are clearly unique to gaze direction. Features can be extracted from the images that are unique markers and that can be used as unique identifiers of the image representing a gaze direction and thus can be used as an eye tracker. The features are not restricted to images of the retina. Images from other parts of the eye, which move with eye direction, can also serve as unique gaze identifiers. FIG. 33 is a block diagram describing the methodology for eye tracking: first the system has a calibration routine. The calibration could be done at intervals. The cycle depends on the rate of change of the features and adapted in consequence. The calibration consists of grabbing images of the retina when the user performs different gaze directions. For example, the user is asked to fixate a feature displayed on the head worn display and that moves to cover a set of gaze directions. Features are then extracted from the images to form a reduced number of unique image identifiers. A database of features corresponding to each gaze direction is formed. By reducing images to unique features, less memory is used. Then eye-tracking is performed by first grabbing an image (retina or other) and then this image is correlated against the images in the database. Then a classification algorithm determines which image in the database the newly grabbed image most resembles. One method is to select the image with the highest correlation. Another use of the anatomy of the retina is for relating intra ocular pressure (IOP) to optic disc displacement. It has been shown that optical disc displacement is related to ocular pressure. Thus by monitoring the location of the optical disc (region near the optic nerve in FIG. 31) continuously, information related to ocular pressure which is a major cause for glaucoma, can be extracted.

Figure 34:
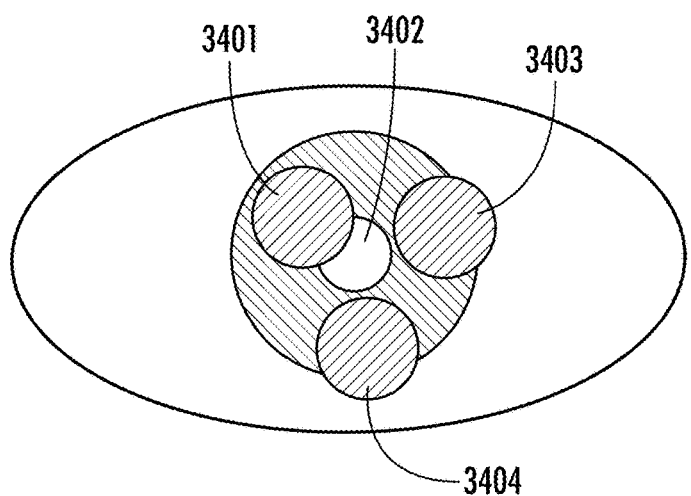
FIG. 34 is an illustration of the eye tracking method using relative confocal intensities from different exit pupils according to an embodiment of this invention.

In another method, eye-tracking is realized by monitoring the intensity of the light reflected by the eye corresponding to each exit pupil. In the example of FIG. 34, showing 3 exit pupils, but not limited to, only the light corresponding to one exit pupil 3401 passes through the eye entrance pupil 3402, the light corresponding to the other exit pupils 3403 and 3404 is blocked. Hence the confocal imaging system will only give an appreciable signal from the exit pupil 3401 that is aligned to the eye entrance pupil 3402. Because the relative spatial position of the eye-box is known in advance (calibrated), the relative intensity ratio at the detectors (detectors in FIG. 27—FIG. 30) gives a measure of the gaze direction. FIG. 34 shows a front view of exit pupils are related to the "eyebox".

Figure 35:
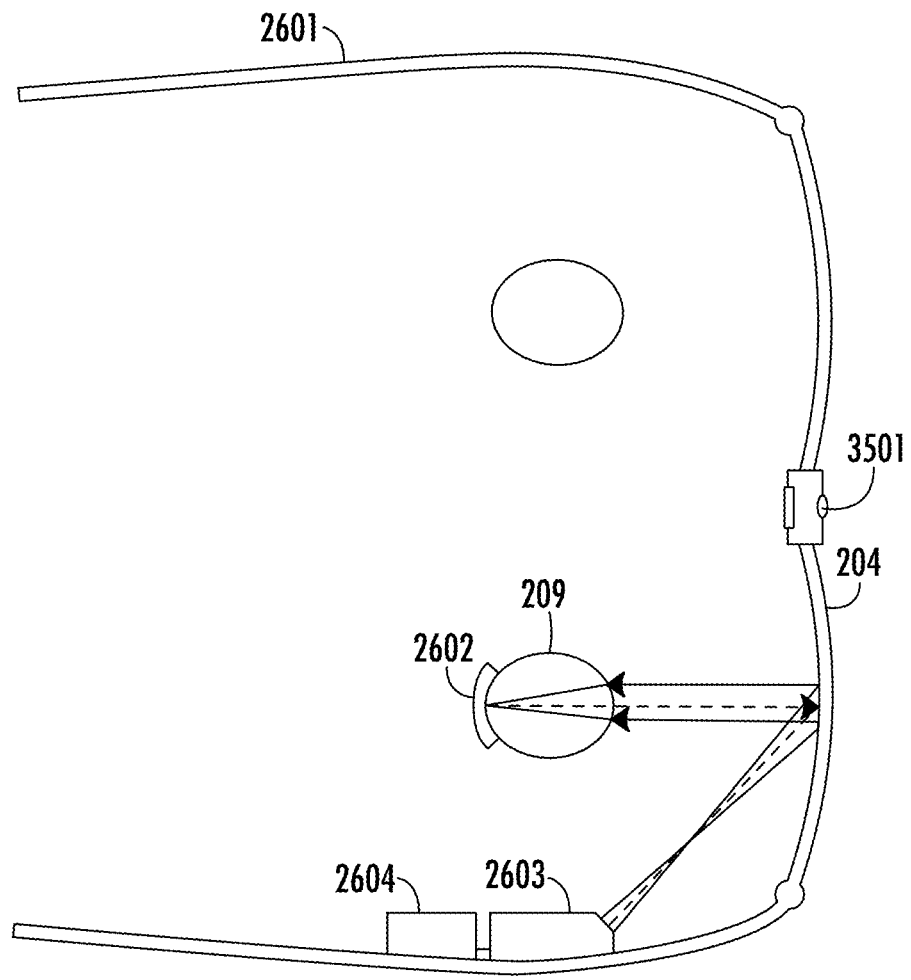
FIG. 35 is a drawing of a scanning projection monocular head worn display including a camera according to an embodiment of this invention.
Figure 36:
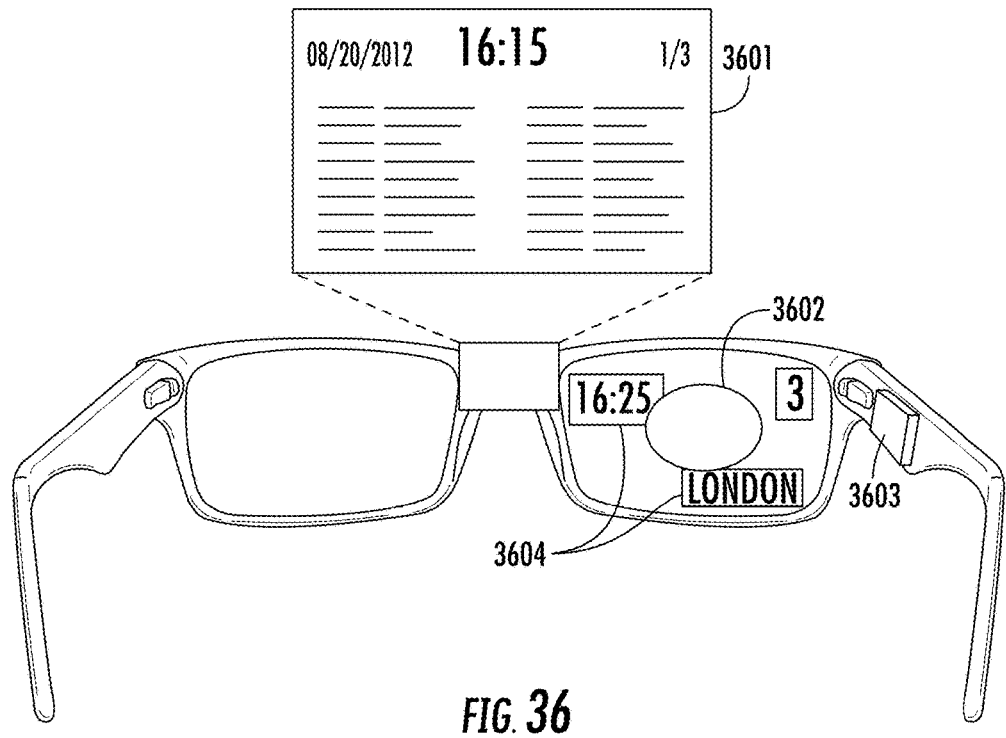
FIG. 36 is an illustration of the method to display data gathered from the camera on a head worn display according to an embodiment of this invention.

FIG. 35 shows an implementation of a multiple exit pupil head worn display with a camera 3501 positioned to look directly in front of the user. As shown in FIG. 36, the camera grabs a scene 3601 and provides a zoomed version of the scene 3604 to the head worn display. For example, people with low vision, such as, but not limited to, cases of age related macular degeneration (AMD) for which there is a loss of visual acuity in the fovea but the peripheral vision is not affected can benefit from having an image zoom option in order to better see details that otherwise they would not be able to see in their macular region 3602 without the zoomed digital image. This is accomplished by grabbing an image with the camera 3501, digitally processing the image appropriately (such as zooming digitally, adding contrast to the image or edge enhancement by way of example) and presenting the processed digital image to the viewer field of view with the help of the augmented reality wearable glasses display of this invention. In other low vision cases such as tunnel vision for which the subject has lot peripheral vision but maintains foveal acuity, the loss of peripheral vision can be circumvented by having a camera 3501 grab an image which is then processed so as to extract useful information (such as objects outside the peripheral vision of the patient). This information is then displayed on the glasses in the foveal region so as to give the patient awareness of the surrounding he/she cannot see. In another embodiment, other sensors than a camera (which is sensitive in the visible or infrared spectral region) are added to the wearable glasses of this invention such as, but not limited to, position sensors (incl. accelerometers), GPS sensors, pressure sensors or any type of sensor that can locate the position in space of the wearable glass. By combining these positioning sensors with an eye tracking system such as, but not limited to, the system described in this application and by using a binocular projection display, for example a system such as but not limited to, with multiple exit pupil (one for each eye), one can generate augmented reality with 3 dimensional information. The positioning sensors locate the position of the eyewear with respect to a scene (e.g. recorded digitally by the camera). The eye tracking system determines the object of interest in the scene. Thus with both information, one can generate the appropriate augmented image to display in relation to the object in the scene.

Figure 37:
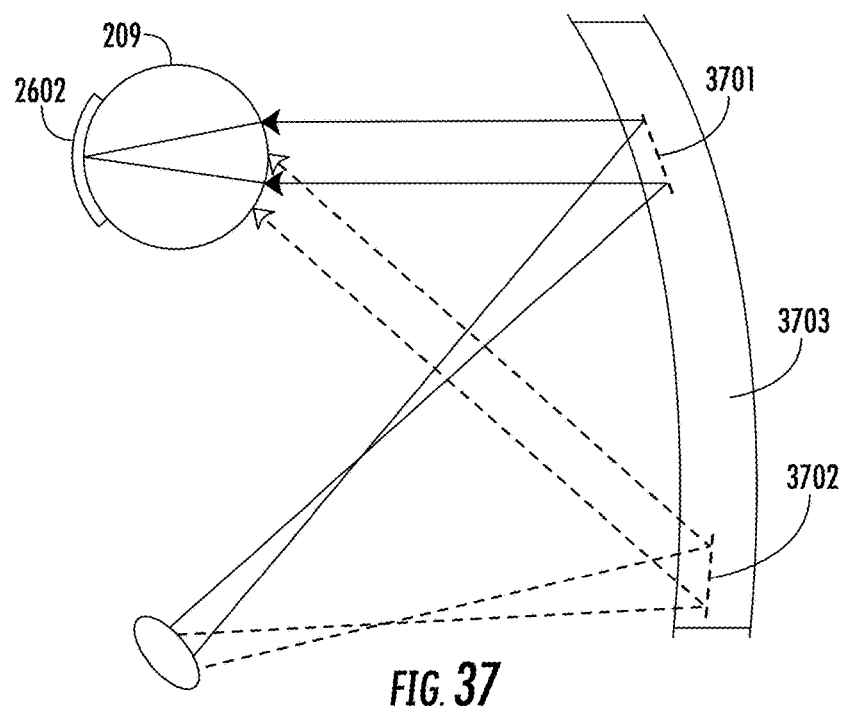
FIG. 37 is an optical schematic of a transflector using embedded narrowband kinoform mirrors in a transparent material according to an embodiment of this invention.

FIG. 37 illustrates embedded small kinoform mirrors 3701 and 3702 in a transparent matrix 3703 which can be any suitable thermo plastics (e.g. Poly Carbonate, PMMA). The function of the small mirrors is to redirect a direction of light beam from the projector to the eye 209. The projector can be a scanning mirror or a fixed microdisplay (LCD, LCOS e.g.). The mirrors can be coated with a thin film so as to provide an adequate spectral reflection response. For purpose of illustration, let's assume 3 eye boxes and monochrome operation. The spectral response of the embedded mirrors is reflective in the spectral band of the 3 light sources and transmissive everywhere else in the visible range. By embedding the kinoform mirrors (which looks like a kinoform) in a material of the same index, the light passing through the holographic transflector is unperturbed.

Figure 38:
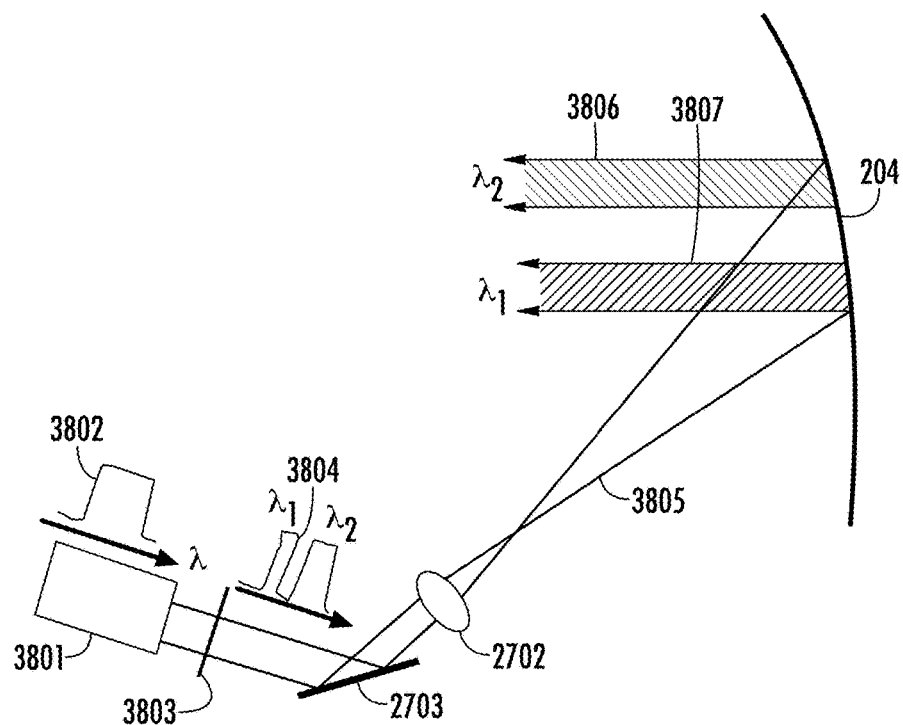
FIG. 38 is an optical schematic of a scanning projection head worn display using a split spectrum source and wavelength multiplexing in a holographic transflector to create multiple exit pupils according to an embodiment of this invention.

FIG. 38 illustrates another method for obtaining multiple exit pupils for the purpose of synthesizing a larger eyebox. A broadband 3802 light source 3801, such as but not limited to light emitting diodes of small emitting apertures (between 1 and 10 micrometers), resonant cavity light emitting diodes of the same small emitting aperture, laser diodes, super luminescent diodes and vcsels, is first spectrally sliced 3803 to produce a spectrum 3804 composed of discrete emission bands each separated by a spectral zone with no light. The resulting collimated light is then scanned by a 2D scanner 2703 which can be but not limited to MEMs scanner, resonant or non-resonant, acousto-optic deflectors, liquid crystal deflector. A projection lens 2702 is used to produce a diverging beam 3805. A holographic transflector 204 recollimates the diverging beam according to the wavelength 3806 and 3807. For example, the holographic transflector can be but not restricted to, a holographic element, a volume holographic element of the polymer, crystal or glass type. A polymer holographic material is preferred since it can laminated onto surfaces. Because the diverging beam is composed of multiple distinct wavelength bands (in the example of FIG. 38, there are two distinct wave-length for illustration purposes), the reflection hologram has a thickness and is made in such a way as to diffract wavelength band 1 3807 to produce a collimated beam corresponding to a certain angular range of the diverging beam. Similarly wavelength band 2 3806 is diffracted to produce a collimated beam which is propagating in the same direction as collimated beam of wavelength 1 but displaced spatially so as to produce an extended eyebox with multiple exit pupils.

Figure 39:
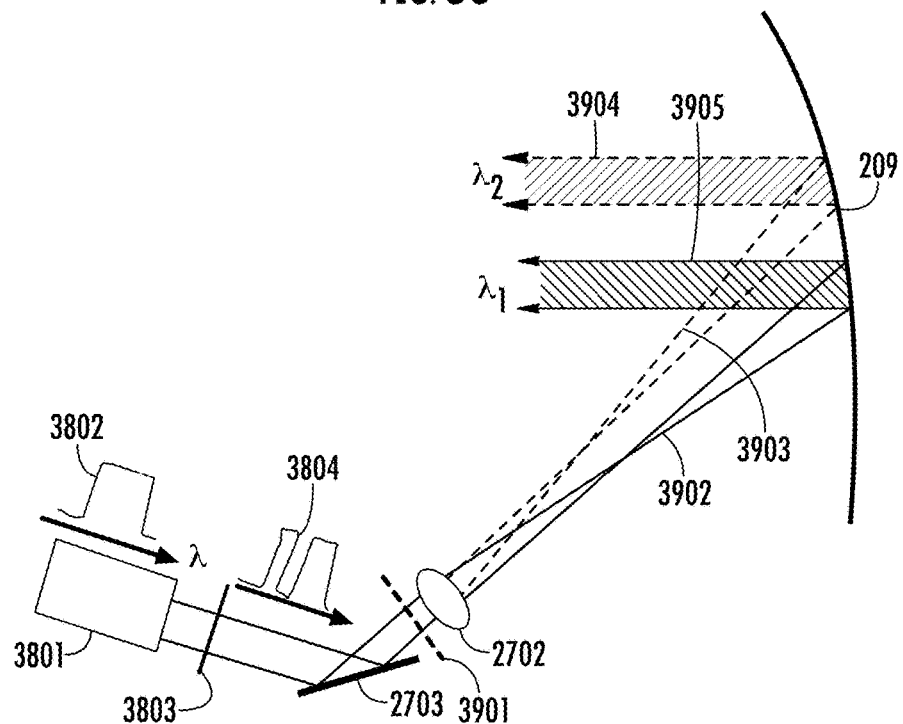
FIG. 39 is an optical schematic of a scanning projection head worn display using a split spectrum source, a diffraction grating and wavelength multiplexing in a holographic transflector to create multiple exit pupils according to an embodiment of this invention.

FIG. 39 illustrates yet another method for obtaining multiple exit pupils. The same collimated light source 3801, as described in FIG. 38, is spectrally filtered 3804 and deflected by a 2D scanner 2703. The light beam is incident on a dispersive optical element 3901, such as, but not limited to, a transmission diffraction grating. After the projection lens 2702, the transmission grating produces two distinct diverging beams 3902 and 3903, corresponding to each wavelength band (two bands in the example illustrated in FIG. 39). The holographic transflector 204, of the same description as in FIG. 38, produces two distinct re-collimated beams 3904 and 3905 corresponding to each wavelength band, which forms the extended eye-box with multiple exit pupils.

Figure 40:
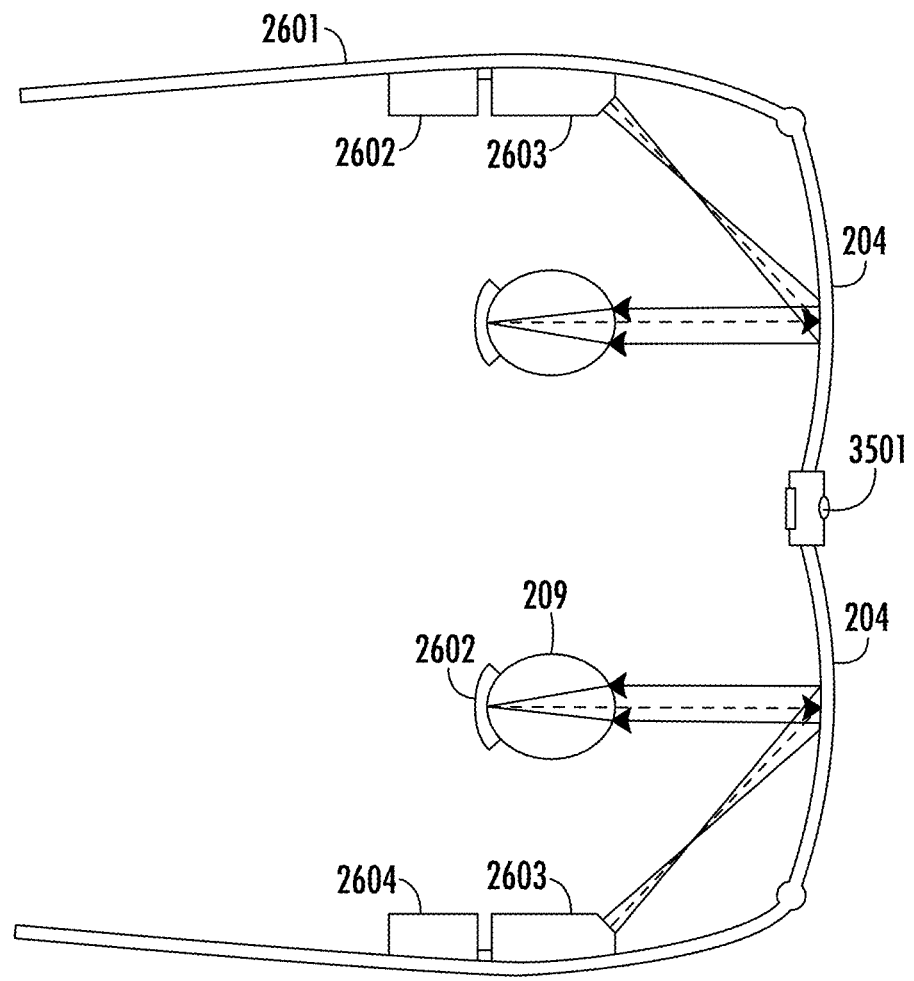
FIG. 40 is a drawing of a scanning projection binocular head worn display including a camera according to an embodiment of this invention.

FIG. 40 illustrates a multiple exit pupil projection system on each side of a pair of glasses 2601 (binocular or biocular). Thus the left and right eye each receives an image from the respective projection system. By using the tracking system described in FIG. 32, FIG. 33, FIG. 34, but not limited to, three-dimensional information can be displayed in accordance with the gaze direction. Three dimensions comes from binocular view. For example, a camera placed on the glasses 3501 grabs an image representing the view of the wearer. By calibrating the camera with the viewer's gaze angle, it is then possible to augment the view with appropriate information. For example, in medicine, a surgeon wearing the eyewear, augmented information could be displayed directly onto the surgeon's gaze direction. The position of important arteries, not seen directly by the surgeon's real view, could be overlayed.

Figure 41:
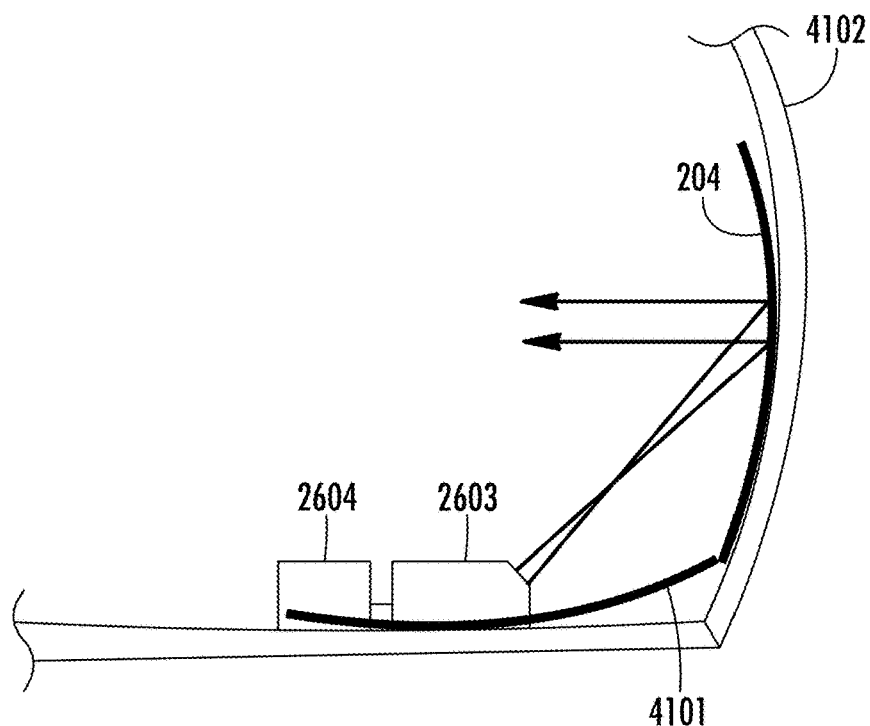
FIG. 41 is a drawing of a scanning projection binocular head worn display attached to the inside of a rigid eyewear frame according to an embodiment of this invention.

FIG. 41 is an embodiment of a rigid structure on which the projection system, i.e., source 2604, detector, scanner or microdisplay 2603 and holographic transflector 204 are placed on. The system is aligned on the rigid structure 4101. The rigid structure is then positioned (attached) to the frame 4102 of an eyewear which can be, but not limited to an eyewear with prescription glasses. The holographic transflector is placed between the projection system and the spectacle. The divergence of the beam coming off the holographic transflector can be adjusted to compensate for the user's eye prescription.

Figure 42:
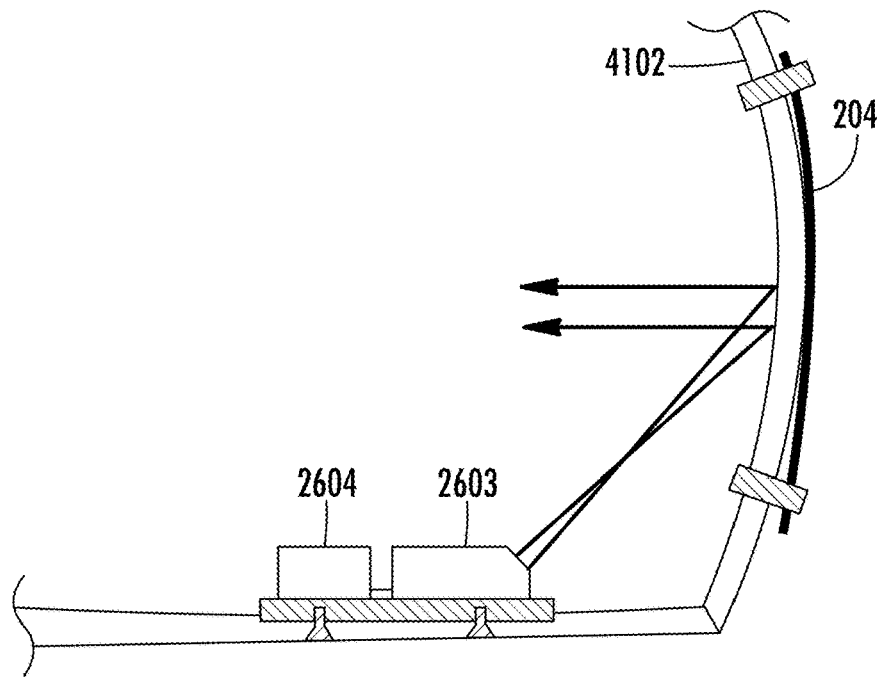
FIG. 42 is a drawing of a scanning projection binocular head worn display attached to the outside of a rigid eyewear frame according to an embodiment of this invention.
Figure 43:
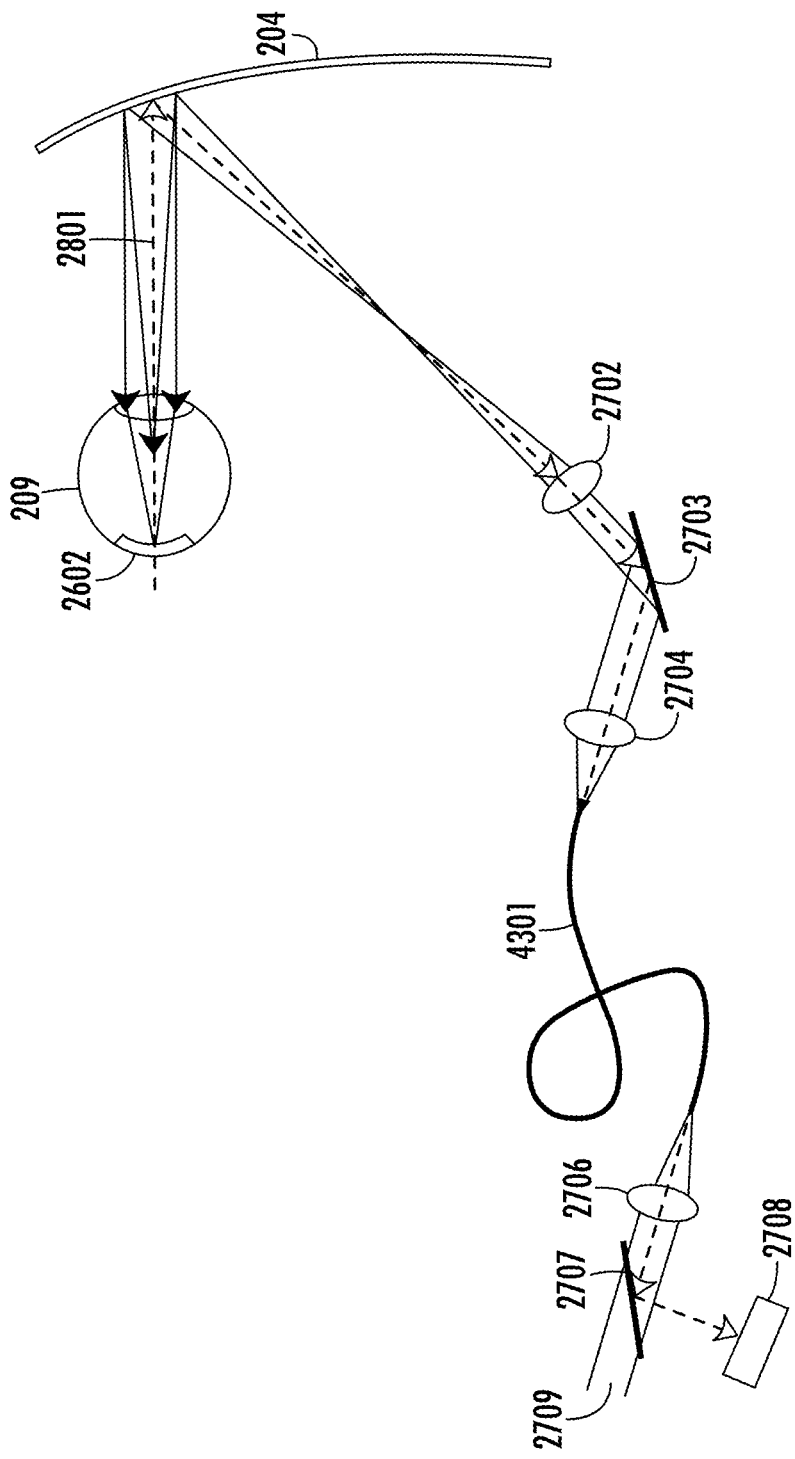
FIG. 43 is an optical schematic of a scanning projection head worn display including confocal imaging of the retina with a double clad fiber according to an embodiment of this invention.

FIG. 42 is another embodiment with the holographic transflector 204 placed on the outside of the spectacles 4101. Thus, the projection system comprising light source 2604, detector, scanner or microdisplay 2603 is attached on the side branch. The holographic transflector is secured such as but not limited to epoxied, clipped, screwed.

What is claimed is:

1. A method for displaying an image via a head-worn display, the method comprising:
    emitting a plurality of light beams, a wavelength of at least one of the plurality of light beams to differ from a wavelength of at least one other of the plurality of light beams;
    modulating an intensity of at least one of the plurality of light beams based at least in part on intensity information corresponding to an image to be projected;
    scanning the plurality of light beams in two distinct axes towards a holographic optical element of the head-worn display to form the image; and
    redirecting the plurality of light beams via the holographic optical element to a plurality of spatially separated exit pupils to project the image at the plurality of exit pupils.

2. The method of claim 1, wherein the intensity of the light beams is representative of pixel values within the image.

3. The method of claim 1, comprising applying, for each of the light beams of the plurality of light beams, one or more of image registration or image distortion correction to the image to align the projected image based on the spatial location of the plurality of exit pupils relative to each other.

4. The method of claim 1, comprising spatially arranging the plurality of exit pupils to form an enlarged eyebox for viewing the image.

5. The method of claim 1, comprising combining the plurality of light beams coaxially to correct angular differences between the plurality of light beams corresponding to each of the plurality of exit pupils.

6. The method of claim 1, further comprising determining a gaze direction of a user.

7. The method of claim 1, wherein scanning the plurality of light beams comprises scanning the plurality of light beams with at least one s33canning mirror comprising a microelectromechanical system (MEMS)-based scanning mirror.

8. A head-worn display comprising:
    a light source, the light source to emit a plurality of light beams, a wavelength of at least one of the plurality of light beams to differ from a wavelength of at least one other of the plurality of light beams;
    at least one scanning mirror to scan the plurality of light beams in two distinct axes to form an image;
    a holographic optical element to receive the scanned plurality of light beams from the at least one scanning mirror and to redirect the plurality of light beams to a plurality of spatially separated exit pupils to project the image at the plurality of exit pupils; and
    a frame to hold the light source, at least one scanning mirror, and holographic optical element in fixed relation to one another, the frame adapted to be worn on the head of a user.

9. The head-worn display of claim 8, the light source to modulate an intensity of at least one of the plurality of light beams based at least in part on intensity information corresponding to an image to be projected.

10. The head-worn display of claim 9, wherein the intensity of the light beams is representative of pixel values within the image.

11. The head-worn display of claim 8, comprising an image processor to apply, for each of the light beams of the plurality of light beams, one or more of image registration or image distortion correction to the image to align the projected image based on the spatial location of the plurality of exit pupils relative to each other.

12. The head-worn display of claim 8, wherein the spatial arrangement of the plurality of exit pupils form an enlarged eyebox for viewing the image.

13. The head-worn display of claim 8, comprising a combiner lens to combine the plurality of light beams coaxially to correct angular differences between the plurality of light beams corresponding to each of the plurality of exit pupils.

14. The head-worn display of claim 8, wherein the plurality of spatially separated exit pupils to expand an eyebox of the user.

15. The head-worn display of claim 8, further comprising an eye tracker to determine a gaze direction of the user.

16. The head-worn display of claim 8, wherein the frame comprises an eyewear frame.

17. The head-worn display of claim 8, wherein the light source comprises a laser light source.

18. The head-worn display of claim 8, wherein the at least one scanning mirror comprises a microelectromechanical system (MEMS)-based scanning mirror.

19. The head-worn display of claim 8, further comprising:
    an eyeglass lens held by the frame, wherein the holographic optical element is integrated with the eyeglass lens;
    a scanning projector held by the frame, the scanning projector positioned adjacent to the eyeglass lens, the scanning projector including the light source and the at least one scanning mirror; and
    a scanning projection lens coupled to the scanning projector.

20. A method for displaying an image viewable by an eye, the image being projected from a portable head-worn display, comprising steps of:
    emitting a plurality of light beams;
    directing each of the plurality of light beams to at least one scanning mirror;
    modulating an intensity each one of the plurality of light beams in accordance with intensity information provided from the image, whereby the intensity is representative of a pixel value within an image;
    scanning each one of the plurality of light beams in two distinct axes with the at least one scanning mirror to form the image; and
    redirecting the plurality of light beams to the eye using an optical element acting as a reflector of the light beams, whereby the redirecting is dependent on an incidence angle of the light beam on the optical element, to create for each light beam an exit pupil at the eye that is spatially separated from the exit pupils of the other light beams.

21. The method of claim 20, further comprising applying an image registration and a distortion correction to the image for each of the light beams, to align the image produced by the plurality of light beams in accordance to a location of the exit pupil for each light beam.

22. The method of claim 20, further comprising spatially arranging the exit pupils formed by the plurality of light beams to form an enlarged area in which the eye is aligned to the portable head-worn display for viewing of the image.

23. The method of claim 20, wherein the plurality of light beams are three light beams of separate visible wavelengths, thereby creating for each of the exit pupils, three light beams for a full color image.

24. The method of claim 23, wherein the optical element is a holographic optical element.

25. The method of claim 24, wherein the holographic optical element is recorded with a plurality of hologram writing lasers closely matched to the wavelengths of the plurality of light beams, and whereby the beams of each of the hologram writing lasers are arranged spatially in a hologram recording setup to match the spatial and angular orientation of the exit pupils and projection source points created by the portable head-worn display.

26. The method of claim 25, wherein the beams of each of the hologram writing lasers are arranged spatially by means of optical fibers.

27. The method of claim 20, further comprising steps of:
tracking an eye position of a user of the head-worn display; and
deactivating at least one of the plurality of light beams associated to each of the exit pupils, in correspondence to the eye's position at a given moment, to deactivate misaligned exit pupils and reduce display power consumption.

28. The method of claim 20, further comprising steps of:
arranging the exit pupils formed by the plurality of light beams, whereby each individual light beam forms a plurality of spatially separated exit pupils, to create multiple regions of interest that are not viewed simultaneously by the eye, each with a subset field of view and associated plurality of exit pupils within a larger overall field of view.

* * * * *